(12) United States Patent
Takehisa

(10) Patent No.: US 6,594,291 B1
(45) Date of Patent: Jul. 15, 2003

(54) ULTRA NARROW BAND FLUORINE LASER APPARATUS AND FLUORINE EXPOSURE APPARATUS

(75) Inventor: Kiwamu Takehisa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 367 days.

(21) Appl. No.: 09/589,274

(22) Filed: Jun. 8, 2000

(30) Foreign Application Priority Data

Jun. 16, 1999 (JP) .......................................... 11-169758
Jun. 16, 1999 (JP) .......................................... 11-169772

(51) Int. Cl.$^7$ .............................................. H01S 3/13
(52) U.S. Cl. ...................... 372/32; 372/29.014; 372/57; 372/55; 372/20
(58) Field of Search ............................ 372/55, 57, 20, 372/32, 29.014

(56) References Cited

U.S. PATENT DOCUMENTS

| | | | | |
|---|---|---|---|---|
| 4,829,536 A | * | 5/1989 | Kajiyama et al. | 372/57 |
| 4,856,018 A | * | 8/1989 | Nozue | 372/98 |
| 4,985,898 A | * | 1/1991 | Furuya et al. | 372/106 |
| 5,050,174 A | * | 9/1991 | Wani et al. | 372/20 |
| 5,150,370 A | * | 9/1992 | Furuya et al. | 372/106 |
| 5,383,217 A | * | 1/1995 | Uemura | 372/58 |
| 5,982,800 A | * | 11/1999 | Ishihara | 372/57 |
| 6,028,879 A | * | 2/2000 | Ershov | 372/57 |
| 6,137,821 A | * | 10/2000 | Ershov | 372/108 |
| 6,154,470 A | | 11/2000 | Basting et al. | |
| 6,381,257 B1 | * | 4/2002 | Ershov et al. | 372/57 |

FOREIGN PATENT DOCUMENTS

| | | | |
|---|---|---|---|
| JP | 2001094185 | * | 4/2001 |
| WO | WO0038281 | | 6/2000 |

* cited by examiner

*Primary Examiner*—Leon Scott, Jr.
(74) *Attorney, Agent, or Firm*—Varndell & Varndell, PLLC

(57) ABSTRACT

An etalon as a wavelength selection element is configured by an optical element whose transmittance or reflectivity cyclically varies, such that, of two oscillation lines of different wavelengths and light intensities in fluorine laser, when a center wavelength of an oscillation line having a stronger light intensity is situated at one selected wavelength in the element, a center wavelength of an oscillation line having a weaker light intensity is situated between two adjacent selected wavelengths in the element. Accordingly, it is possible to oscillate an ultra narrow band fluorine laser apparatus by one line only, a wavelength width of this line can be narrowed to about 0.2 pm, and the drop in laser output can be reduced. By monitoring the laser output (output characteristics) with the etalon serving as the wavelength selection element, the wavelength selected by the etalon can be adjusted so as to maximize the output of the laser output from the etalon. Thus, the wavelength of laser light of a fluorine laser, which has been band-narrowed from 1–2 pm to about 0.2 pm, can be calibrated accurately.

20 Claims, 13 Drawing Sheets

ULTRA NARROW BAND FLUORINE LASER APPARATUS AND FLUORINE EXPOSURE APPARATUS

BACKGROUND OF THE INVENTION

1. Field of the Invention

The present invention relates to an ultra narrow band laser apparatus for producing ultra narrow band laser light from a fluorine laser for use as a light source for a stepper or other fluorine exposure apparatus, and to a fluorine exposure apparatus.

2. Description of the Related Art

Qualities required of exposers for use in lithography include resolution, precision in alignment, processing capability, and apparatus reliability. Of these, resolution R, which is most intimately related to fine patterning ability, is expressed by R=k·λ/NA (where k is a constant, λ is the exposure wavelength, and NA is the numerical aperture of the projecting lens). Accordingly, lower exposure wavelengths λ are more useful in terms achieving better resolution.

Conventional exposers utilize exposer light sources such as the i line (wavelength 365 nm) of a silver mercury lamp or a 248 nm-wavelength krypton-fluoride (KrF) excimer laser. These are respectively called i line exposers and KrF exposers. Reducing projection lens assemblies composed of a multitude of lenses comprising quartz glass are widely used as projection optical systems in these i line exposers and KrF exposers.

To enable processing of smaller features, exposers employing 193 nm-wavelength argon-fluoride (ArF) excimer lasers as light sources are coming into use as the next generation of lithography exposers. These are termed ArF exposers; these ArF exposers employ narrow band ArF excimer lasers having spectral width (bandwidth) of about 0.6 pm. For the reducing chromatic abberation, achromatic lenses comprising dual materials are used.

Narrow band elements known to provide ArF excimer laser bandwidths as small as about 0.6 pm include etalons, gratings, mode selectors, and other such elements. Of these elements, mode selectors are discussed in some detail in PROCEEDING OF THE EEE, VOL. 60, NO. 4, APRIL 1972, pp. 422–441.

ArF excimer laser apparatus include those employing two laser units. Specifically, a process termed injection seeding, wherein one of the laser units generates a seed light and this seed light is injected into an oscillator (the second laser unit), is implemented in an ArF excimer laser apparatus.

An injection seeding type ArF excimer laser apparatus is discussed, for example, in "Dai 59-kai Oyo Butsurigaku Kanko Rengo Koenkai Preprints", p. 950, 17-a-P2-1, 1998.

A fluorine exposer employing as the light source an approximately 157 nm-wavelength fluorine laser is under study as a next-generation ArF exposer for lithography.

This fluorine laser produces two intense oscillation lines of different wavelengths and light intensities (also called output lines), the wavelengths of which are 157.6299 nm (wavelength λ1) and 157.5233 nm (wavelength λ2) respectively. Bandwidth of each of the two oscillation lines is from 1 to 2 pm.

When using this fluorine laser for exposure, it is typically advantageous to select the stronger wavelength line (λ1= 157.6299 nm) (hereinbelow termed the "strong line," the other being termed the "weak line") (this process is hereinbelow termed "single line mode"). Conventionally, one or two prisms were used for single line mode.

Experimental findings pertaining to single line mode in fluorine lasers for use in fluorine exposers are reported, for example, in "SPIE 24$^{th}$ International Symposium on Microlithography, February, 1999.

Double line mode for a fluorine laser is described, for example, in CAN. J. PHYS. VOL. 63, 1983, pp. 217–218.

In the fluorine exposers described above, it is a difficult matter to implement a refracting type reducing projection optical system using simply the lenses typically employed in exposers to date (i.e., exposers up through ArF exposers).

The reason is that with a 157 nm wavelength fluorine laser, transmittance through quartz glass is extremely low, imposing severe limitations on the materials that can be used to, for example, calcium fluoride. When a reducing projection optical system is constructed of monochromatic lenses of calcium fluoride only, when the fluorine laser is tuned to single line mode, the oscillation laser light from the fluorine laser will not have a sufficiently narrow band. The bandwidth resulting from band narrowing is about 1 pm, but in actual practice band narrowing to a bandwidth about ⅕ of that, namely, a bandwidth of about 0.2 pm, is thought necessary for single line mode.

Conventionally, since it has proven difficult to achieve band narrowing to bandwidths of 0.2 pm or smaller for single line mode for a fluorine laser, it has been thought necessary to implement the reducing projection optical system with a reflecting/refracting type reducing projection optical system (hereinbelow referred to as a catadioptric type) capable of being used over a bandwidth 10 times wider than a total reflection type optical system composed of lenses only.

The reason why it has been difficult in conventional practice to achieve band narrowing of fluorine lasers to bandwidths of 0.2 pm or smaller is that when one or two prisms are situated in the laser resonator for single line tuning, laser output drops down to about 40%. Installing an etalon or the like enabling greater band narrowing (i.e., one with reflectivity on the order of 80%) in order to achieve band narrowing of the bandwidth to 0.2 pm increases the insertion loss further by about 50%. This makes laser operation difficult or appreciably reduces laser output.

The reasons for the significant drop in laser output occurring with installation of an etalon in a fluorine are now discussed.

It is known that for an etalon having a high reflectivity reflective film, a low degree of planarity typically results in lower maximum transmittance. Where the etalon is fabricated with a calcium fluoride substrate, a typical optical system capable of being used at 157 nm wavelength, the etalon has a lower degree of hardness than quartz, and is moreover crystalline, which makes polishing difficult; for these and other reasons, planarity of no less than about 1/20 the wavelength can be achieved. On the other hand, it is known that, with the use of quartz, etalons affording planarity on the order of 1/100 the wavelength can be utilized.

Thus, where, for example, an etalon with finesse of 10 is used for band narrowing of 2 pm bandwidth laser light to a bandwidth of 0.2 pm, it is necessary for the etalon to have a coating with reflectivity of 80% or above. If the degree of planarity of the etalon is 1/20 the wavelength, maximum transmittance on the order of only about 50% can be achieved in the etalon.

Accordingly, it is a first object of the present invention to provide an ultra narrow band fluorine laser apparatus capable of operation in single line mode, with the bandwidth of the line narrowed to about 0.2 pm, and additionally affording a reduction in the drop in laser output.

It is a second object of the invention to provide an ultra narrow band fluorine laser apparatus whereby oscillation laser light from a fluorine laser may be provided as an exposure light source to a fluorine exposer utilizing a lens-only total refraction type reducing projection optical system.

In systems where a single line of a fluorine laser (i.e., the line of wavelength $\lambda 1=157.6299$ nm) is used as-is, the line spectrum is determined absolutely spectrally, so wavelength stabilization is not needed. Where bandwidth is narrowed to about 0.2 pm, despite the need for the band narrowed wavelength to be stable within a 1 to 2 pm bandwidth single line spectrum, it is difficult to ascertain whether wavelength is in fact stable. This makes it difficult to correctly calibrate wavelength.

The reason is that in the vacuum ultraviolet region in proximity to the 157.6299 nm $\lambda 1$ wavelength, it was difficult to use an absolute wavelength where the wavelength had been narrowed to about 0.1 pm (another stable light source (lamp) or absorption line).

It was also difficult to develop a fluorine exposer comprising a fluorine laser apparatus capable of output of single line-tuned, band narrowed laser light.

It is accordingly a third object of the invention to provide a fluorine exposure apparatus and ultra narrow band fluorine laser apparatus capable of correct calibration of the wavelength of laser light from a fluorine laser wherein, for example, the 157.6299 nm $\lambda 1$ wavelength line of bandwidth of 1 to 2 pm has been narrowed to about 0.2 pm.

SUMMARY OF THE INVENTION

In order to achieve the first object, a first invention provides an ultra narrow band fluorine laser apparatus which provides oscillated laser light of a fluorine laser as a light source for an exposure apparatus, comprising:

a wavelength selection element whose transmittance or reflectivity varies cyclically in accordance with a wavelength of incident light, for narrowing a band of the oscillated light of the fluorine laser, wherein the wavelength selection element is composed of:

an optical element whose transmittance or reflectivity varies cyclically, so that, of two oscillation lines of different wavelengths and light intensities in the fluorine laser, when a center wavelength of a first oscillation line thereof having a stronger light intensity is situated at one selected wavelength in the element, a center wavelength of a second oscillation line having a weaker light intensity than the first oscillation line is situated between two adjacent selected wavelengths in the element.

In a second invention according to the first invention, wherein the wavelength selection element is constituted such that transmittance at the center wavelength of the second oscillation line becomes 0.64 times or less the transmittance at the center wavelength of the first oscillation line.

In a third invention according to the first invention, the wavelength selection element is a mode selector composed of splitting means having a beam splitting face and two reflection means having reflecting faces.

In a fourth invention, the ultra narrow band fluorine laser apparatus according to the first or second invention further comprises an oscillating stage for oscillating the laser light of the fluorine laser; and an amplifying stage, and wherein the wavelength selection element is situated on an optical path between the oscillating stage and the amplifying stage.

In order to achieve the second object, according to a fifth invention, in any of the first to fourth inventions, wherein the laser light band-narrowed by the wavelength selection element is provided to a fluorine exposure apparatus having a lens-only total refraction type reducing projection optical system.

The first and second inventions shall now be described making reference to FIGS. 1 and 2.

Referring to FIG. 1, an etalon 16, a wavelength selection element serving as a band narrowing element, is situated on the optical path between a beam splitter 14 and a mirror 15. The cycle (FSR) of etalon 16 is 3.0 pm; finesse is 15.

Referring to FIG. 2, maximum transmission wavelength $\lambda a$ is matched to the center of the 157.6299 nm $\lambda 1$ wavelength strong line (oscillation line) L1 by etalon 16. As a result, laser beam L12 incident on etalon 16 from beam splitter 14, upon passing through etalon 16 (i.e., laser beam L13), assumes peak power of about 50% at the center wavelength of strong line L1, with bandwidth being about 0.2 pm, ⅟₁₅ the original line width.

Dividing the wavelength differential of the two lines of the fluorine laser of 106.6 pm (=157,629.9 pm−157,523.3 pm) by the FSR of 3.0 pm gives a value of 35.53, so transmittance at the 157.5233 nm $\lambda 2$ wavelength is about several %.

That is, since the decimal part of the value 106.6/FSR (35·53) is 0.53, in etalon 16 affording maximum transmittance at the 157,629.9 nm $\lambda 1$ wavelength, the 157,523.3 nm $\lambda 2$ wavelength is substantially medial with respect to two adjacent maximum transmission wavelengths $\lambda b$, $\lambda c$, as shown in FIG. 2. Thus, since etalon 16 produces large loss for the 157.5233 nm $\lambda 2$ wavelength weak line (oscillation line) L2, laser beam L13 has a strong line L1 component of 90% or greater with bandwidth of about 0.2 pm.

Returning now to FIG. 1, as laser beam L13 is reflected by mirror 15, again passing through etalon 16 to be reflected by beam splitter 14 and directed into a laser chamber 13, whereby the proportion of the band narrowed strong line L1 increases further. Accordingly, the laser is oscillated with the strong line L1 exclusively, whereby a laser beam L14 of 0.2 pm bandwidth strong line L1 exclusively is obtained at output mirror 11.

The intensity ratio of the two lines L1, L2 of the fluorine laser is the to be such that the weak line L2 is about ⅙ to ⅐ the strong line L1. In consideration of this intensity ratio, in order that extremely weak light traverse at least twice the etalon or other wavelength selection element so that intensity at the center wavelength of weak line L2 drops to 1% or less the intensity at the center wavelength of strong line L1, the transmittance ratio at the wavelength selection element is appropriately one such that transmittance at the center wavelength of weak line L2 is (⅙)^(¼)=0.64 times or less the transmittance at the center wavelength of strong line L1.

That is, characteristics (specifications) for the wavelength selection element are established such that transmittance at the center wavelength of weak line L2 is about 0.64 times or less the transmittance at the center wavelength of strong line L1.

According to the first invention described hereinabove, the wavelength selection element is composed of an optical element with cyclically varying transmittance or reflectivity, such that, of the two oscillation lines of different wavelengths and light intensities in the fluorine laser, when the center wavelength of the oscillation line having stronger light intensity is situated at one selected wavelength in the element, the center wavelength of the oscillation line having weaker light intensity is situated between two adjacent selected wavelengths in the element, whereby it becomes possible to generate efficiently laser light of bandwidth narrowed to about 0.2 pm with a single strong line of 157.6299 nm wavelength exclusively, without the use of prisms to give the single line.

According to the second invention, transmittance at the center wavelength of the second oscillation line (weak line L2) is set to about 0.64 times or less the transmittance at the center wavelength of the first oscillation line (strong line L1), whereby oscillation of laser light by the second oscillation line may be inhibited.

The third invention is now described making reference to FIG. 5.

Referring to FIG. 5, in ultra narrow band fluorine laser apparatus 500, the resonator that surrounds laser chamber 52 is composed of a total reflection mirror 51 and a mode selector 501. Mode selector 501 is composed of a beam splitter 53 having a beam splitting action and two reflecting mirrors 54a, 54b. This mode selector 501 is the wavelength selection element having a function like that of an output mirror for outputting laser light of the selected wavelength.

In mode selector 501, where d is the gap (more accurately, the optical path length) between reflecting mirror 54a and reflecting mirror 54b, the mode selector 501 cycle (FSR) is expressed as $\lambda^2/(2nd)$, where n=1.

Here, since d=12.3 mm, FSR is 1.01 pm; as a result, 106.6/1.01=105.5.

In mode selector 501 upon which a laser light impinges from laser chamber 52, a portion of this laser light is passed through beam splitter 53, while another portion of the laser light is reflected by beam splitter 53 and then reflected by reflecting mirror 54b.

A portion of the laser light reflected by reflecting mirror 54b is reflected by beam splitter 53 or passes through beam splitter 53. The laser light reflected by beam splitter 53 is again directed into laser chamber 52, while laser light passing through beam splitter 53 is reflected by reflecting mirror 54a.

Laser light reflected by reflecting mirror 54a is then reflected by beam splitter 53 and output as a laser beam L50; a portion of this laser light passes through beam splitter 53 and is reflected by reflecting mirror 54b.

By repeating this operation, as laser light is directed into laser chamber 52 the proportion of narrow band strong line L1 in the laser light increases, which is then output from beam splitter 52.

That is, since 106.6/1.01=105.5, tuning to the 157.6299 nm λ1 wavelength strong line L1 by mode selector 501 suppresses the 157.5233 nm λ2 wavelength weak line L2, whereby a 157.6299 nm λ1 wavelength laser beam L50 is obtained from beam splitter 53.

According to the third-invention described hereinabove, the mode selector serving as the wavelength selection element is composed of splitting means having a beam splitting face (a beam splitter, for example) and two reflecting means having reflecting faces (reflecting mirrors, for example), whereby the means having a beam splitting face may be constituted of a no-coat (no coating) substrate, and mirrors with total reflection films may be employed as the means having reflecting faces.

Accordingly, the wavelength selection element may be constituted without the use of a half-mirror employing a partial reflection layer for an etalon (one wavelength selection element).

That is, since the need to use a wavelength selection element, such as an etalon, requiring a partial reflection layer (which is susceptible to damage) is obviated, in an ultra narrow band fluorine laser apparatus employing a mode selector, the mode selector remains undamaged and moreover is stable for an extended period, affording band narrowing of oscillation laser light.

The fourth invention is now discussed making reference to FIG. 7.

Referring to FIG. 7, ultra narrow band fluorine laser apparatus 700 is of seeded injection type, composed of a seed laser 71 as the oscillating stage and an oscillator 72 as the amplifying stage.

As regards seed laser 71, an output mirror 73 and a total reflection mirror 74 are situated to either side of a laser chamber 75 so as to constitute a stabilizing resonator. No band narrowing element is present in the resonator. Accordingly, the laser beam L71 from seed laser 71 contains both strong and weak lines L1, L2, with both lines, being un-narrowed, having bandwidth of about 1 pm.

Laser beam 71 passes through an etalon 76, a wavelength selection element situated to the outside of seed laser 71. The characteristics of etalon 76 are an FSR of 3.0 pm and finesse of 15. The laser beam L72 passing through etalon 76 is narrowed to bandwidth of 0.2 pm and consists of a single line only.

The energy of laser beam L72 is about 1/10 lower than that of laser beam L71. The narrowed laser beam L72 proceeds to an oscillator 72, the second fluorine laser apparatus. This laser beam L72 is injected as seed light into the resonator via the aperture in an apertured concave mirror 78. As laser beam L72 discharges during passage through laser chamber 79, there is obtained a laser beam L73 having the same bandwidth but increased power.

According to the fourth invention described hereinabove, a wavelength selection element is situated between the oscillating stage and the amplifying stage, whereby the laser light need not be subjected to band narrowing in the oscillating stage, thus facilitating laser oscillation in the oscillating stage to give laser light of sufficiently long pulse width.

Accordingly, with the ultra narrow band fluorine laser of the fourth invention, laser light may be amplified highly efficiently even with a modicum of synchronization error between the oscillating stage and the amplifying stage.

The fifth invention is now discussed making reference to FIG. 3.

Referring to FIG. 3, fluorine exposer 300 is broadly composed of an exposer main body 200 and an ultra narrow band fluorine laser apparatus 100 (see FIG. 1).

Exposer main body 200 is arranged on a grating 21 in a cleanroom, while ultra narrow band fluorine laser apparatus 100 is arranged on a floor bed 22 (typically termed a "subfloor") situated below grating 21.

The laser beam L20 obtained from ultra narrow band fluorine laser apparatus 100, which consists exclusively of the strong line L1 with bandwidth of approximately 0.2 pm, is reflected upward by a mirror 23a so as to pass through an aperture 24 in grating 21 and into exposer main body 200.

In exposer main body 200, the laser beam L22 from a reticle 29 passes through a reducing projection lens 30 and impinges on a wafer 31. The reducing projection lens 30 used as the reducing projection optical system is composed of a monochromatic lens comprising calcium fluoride.

According to the fifth invention described hereinabove, the laser beam from an ultra narrow band fluorine laser apparatus is provided to a fluorine exposure apparatus having a total refraction type reducing projection optical system, whereby a reducing projection optical system design analogous to that in a conventional krypton-fluoride (KrF) exposer may be adopted in a fluorine exposure apparatus, thus quickly and inexpensively providing a commercial fluorine exposure apparatus.

In order to achieve the third object, a sixth invention provides an ultra narrow band fluorine laser apparatus which narrows a band of laser light of a fluorine laser and provides the band-narrowed laser light as a light source for an exposure apparatus, comprising:

a wavelength selection element being arranged so that a selected wavelength can be adjusted, for narrowing the band of incident laser light of the fluorine laser for output;

monitoring means for monitoring the output of laser light output from the wavelength selection element; and adjusting means for adjusting, on the basis of a monitoring outcome from the monitoring means, the wavelength selected by the wavelength selection element so as to maximize the output of laser light output from the wavelength selection element.

In a seventh invention according to the sixth invention, the wavelength selection element comprises:

an optical element for varying a selected wavelength in accordance with an angle of incidence of the laser light thereon;

the monitoring means comprises:

means for monitoring output of laser light of each selected wavelength corresponding to each of a plurality of different angles of incidence for the laser light incident on the optical element; and the adjusting means comprises:

control means for computing, on the basis of a monitoring outcome from the means for monitoring, the angle of incidence serving to maximize the output of the laser light output from the wavelength selection element, and causing laser light to be incident on the wavelength selection element on the basis of the angle of incidence so calculated.

In an eighth invention, the ultra narrow band fluorine laser apparatus according to the seventh invention further comprises:

varying means for varying a placement position of the wavelength selection element within a range in which the laser light is incident on the wavelength selection element; and the control means comprises:

means for controlling the varying means in such a way that when the output of laser light output from the wavelength selection element whose placement position is varied by the varying means reaches maximum, laser light is caused to be incident on the wavelength selection element on the basis of the angle of incidence calculated from the monitoring outcome.

In a ninth invention, the laser apparatus according to the seventh invention further comprises:

reflecting means for reflecting laser light so as to guide the laser light into the wavelength selection element; and varying means for varying a placement position of the reflecting means within a range such that laser light reflected by the reflecting means is incident on the wavelength selection element; and the control means comprises:

means for controlling the varying means in such a way that when the output of the wavelength selection element upon which is incident laser light from the reflecting means whose placement position is varied by the varying means reaches maximum, laser light is caused to be incident on the wavelength selection element on the basis of the angle of incidence calculated from the monitoring outcome.

In a tenth invention according to the sixth invention, the wavelength selection element is a mode selector composed at least of splitting means having a beam splitting face; and two reflecting means having reflecting faces, an optical path length being determined by relative positions of these plurality of composing elements;

the monitoring means comprises:

means for monitoring output of laser light for each of selected wavelengths corresponding to each of a plurality of different optical path lengths in the mode selector; and the adjusting means comprises:

optical path length adjusting means for adjusting optical path length in the mode selector by varying the placement of at least one composing element selected from the plurality of composing elements in the mode selector; and control means which, for each of the plurality of different optical path lengths resulting from adjustment by the optical path length adjusting means, calculates, on the basis of a monitoring outcome monitored by the means for monitoring, the optical path length so as to maximize the output of the laser light output from the wavelength selection element.

The fluorine exposure apparatus of an eleventh invention comprises the ultra narrow band fluorine laser apparatus according to any of the sixth to tenth inventions; and an exposure apparatus main body employing narrow band laser light oscillated from the ultra narrow band fluorine laser apparatus as a light source for exposure to subject a wafer to an exposure process, and notifying the ultra narrow band fluorine laser apparatus when a wafer to be subjected to the exposure process is exchanged, wherein the ultra narrow band fluorine laser apparatus is designed to adjust a wavelength selected by the wavelength selection element when notified by the exposure apparatus of exchange of the wafer to be subjected to the exposure process.

The fluorine exposure apparatus of a twelfth invention comprises the ultra narrow band fluorine laser apparatus according to any of the sixth to tenth inventions; and an exposure apparatus main body employing narrow band laser light oscillated from the ultra narrow band fluorine laser apparatus as a light source for exposure to subject a wafer to an exposure process; wherein the ultra narrow band fluorine laser apparatus is designed to adjust a wavelength selected by the wavelength selection element immediately after start of laser oscillation.

The sixth to eighth inventions shall be described making reference to FIGS. 9 and 10.

A mechanism operates at predetermined time intervals to calibrate laser beam L91 wavelength to the center of strong line L1.

When a wafer is not being subjected to an exposure process (when a wafer is not being irradiated with laser light), a power monitor 99 detects the output of laser beam L92 from a mirror 98 that has come to a halt at a location indicated by symbol 98b, and sends a signal reflecting this finding (monitoring outcome) to a control unit 102 via a signal line 101a.

On the basis of this signal, control unit 102 performs rotation control of a rotating stage 103 via a signal line 101b. That is, while rotating an etalon 97 in small increments by performing rotation control of a rotating stage 103, control unit 102 measures the output of laser beam L92.

This yields a characteristics graph (profile curve) of measured output values (relative values) versus etalon 97 setting angle like that shown in FIG. 10. Setting angle corresponds to the angle of rotation when rotating stage 103 is rotated from a pre-established reference position for etalon 97. Setting angle also corresponds to the angle of incidence of laser light from beam splitter 95 onto etalon 97.

Control unit 102 computes a setting angle θ corresponding to a medial location between the sloping lines on either side of the profile curve (peak waveform), for example, to a medial point P lying midway between point P1 and point P2. By rotating the rotating stage 103, i.e., etalon 97, to give this setting angle θ, the wavelength of laser beam L91 is matched with the center wavelength of strong line L1.

According to the sixth to eighth inventions described hereinabove, by monitoring laser light output (output characteristics) by the wavelength selection element, it is possible to adjust the wavelength selected by the wavelength selection element (for example, adjusting the position of the wavelength selection element) in order to maximize the output of laser light from the wavelength selection element.

Accordingly, it is possible to reset the wavelength selection element to a state such that laser light output is maximized prior to actual use of the laser light as exposure light.

By periodically re-adjusting the position of the wavelength selection element through monitoring of wavelength selection element laser light output so as to constantly maintain that laser light output at maximum, it becomes possible to calibrate the wavelength of narrow band laser light.

The ninth invention shall be described making reference to FIGS. 10 and 11.

When a wafer is not being subjected to an exposure process, a power monitor 110 detects the output of laser beam L102 from a mirror 109 that has come to a halt at a location indicated by symbol 109b, and sends a signal reflecting this finding (monitoring outcome) to a control unit 112 via a signal line 111a. On the basis of this signal, control unit 112 controls a piezo element 113 via a signal line 111b to slightly tilt a total reflection mirror 106.

Thus, when total reflection mirror 106 is tilted to a tilt angle based on the signal from control unit 112, the optical path of the laser light passing through etalon 108 changes slightly with this tilting (for example, the angle of incidence of laser light from total reflection mirror 106 onto etalon 108 changes) so that maximum transmission wavelength in etalon 108 changes slightly.

In control unit 112, the output value of laser light L102 versus the angle of incidence of laser light from total reflection mirror 106 onto etalon 108 is measured.

This yields a profile curve (see FIG. 10) of measured output values (relative values) versus the angle of incidence of laser light onto etalon 108, i.e., the angle of tilt of total reflection mirror 106. On this curve, the vertical axis gives measured output values (relative values) and the horizontal axis gives the tilt angle of total reflection mirror 106.

Once such a profile curve has been generated, control unit 112 computes a total reflection mirror 106 tilt angle corresponding, for example, to a medial point P lying midway between point P1 and point P2 on the profile curve (peak waveform). By controlling piezo element 113 in order to change the tilt of total reflection mirror 106 so as to give this tilt angle, the wavelength of laser beam L101 is matched with the center wavelength of strong line L1.

According to the fourth invention described hereinabove, by monitoring laser light output by the wavelength selection element (output characteristics) it is possible to adjust the wavelength selected by the wavelength selection element (for example, adjusting the position of the wavelength selection element) in order to maximize the output of laser light from the wavelength selection element, thus enabling calibration of the wavelength of narrow band laser light.

The tenth invention shall be described making reference to FIGS. 10 and 12.

When a wafer is not being subjected to an exposure process, a power monitor 110 detects the output of laser beam L102 from a mirror 109 that has come to a halt at a location indicated by symbol 109b, and sends a signal reflecting this finding to a control unit 112 via a signal line 111a.

On the basis of the received signal, control unit 112 controls movement of a piezo element 113 via a signal line 111b to bring about slight forward or backward movement of a reflecting mirror 122b. This movement changes the gap between a reflecting mirror 122a and reflecting mirror 122b (i.e., optical path length) and thus the selected wavelength in mode selector 120 changes.

In control unit 112, the output value of laser light L102 versus the distance of movement of reflecting mirror 122b from a predetermined location is measured.

This yields a profile curve (see FIG. 10) of measured output values (relative values) versus the distance of movement of reflecting mirror 122b (optical path length of reflecting mirror 122a and reflecting mirror 122b) in mode selector 120. On this curve, the vertical axis gives measured output values (relative values) and the horizontal axis gives values showing the distance of movement of reflecting mirror 122b.

Once such a profile curve has been generated, control unit 112 computes a value showing the distance of movement of reflecting mirror 122b corresponding, for example, to a medial point P lying midway between point P1 and point P2 on the profile curve (peak waveform). By controlling piezo element 113 in order to move reflecting mirror 122b so as to achieve this distance of movement value, the wavelength of laser beam L101 is matched with the center wavelength of strong line L1.

According to the tenth invention described hereinabove, even where a mode selector is used as a wavelength selection element, since the wavelength selected by the mode selector is adjusted on the basis of monitoring of laser light output by the mode selector (output characteristics), it is possible to reset the wavelength selection element to a state such that laser light output is maximized prior to actual use of the laser light as exposure light.

The eleventh invention shall be described making reference to FIGS. 10 and, 13.

In ultra narrow band fluorine laser apparatus 900 of fluorine exposer 1300, during the interval of about 20 seconds from completion of exposure treatment of a wafer 141 to completion of placement and alignment of a next wafer on stage 142, wavelength is calibrated on the basis of a profile curve (see FIG. 10).

As regards the timing for the wavelength calibration, a signal indicating completion of exposure treatment of the wafer is transmitted to ultra narrow band fluorine laser apparatus 900 via a signal line 143. Ultra narrow band fluorine laser apparatus 900, having received the exposure completion signal, acquires the profile curve and performs wavelength calibration on the basis of this curve.

The twelfth invention shall be described making reference to FIG. 14.

In ultra narrow band fluorine laser apparatus 900 of fluorine exposer 1300, several tens of pulses generated at a time T1 at which initial effect is produced (hereinbelow referred to as "initial effect time"), shown in FIG. 14, are utilized to calculate a curve like that shown in FIG. 15, and wavelength calibration is performed on the basis of this curve.

According to the eleventh and twelfth inventions described hereinabove, laser light wavelength is calibrated each time that a wafer for exposure treatment is exchanged, thus avoiding a state in which exposure conditions differ for individual wafers. That is, exposed wafers of uniform quality are obtained.

Further, as wavelength calibration of laser light is performed utilizing pulses generated at the outset of laser operation, wavelength-calibration narrow band laser light is used for wafer exposure.

DESCRIPTION OF THE PREFERRED EMBODIMENTS

The embodiments of the invention are described hereinbelow making reference to the accompanying drawings.

Figure 1:
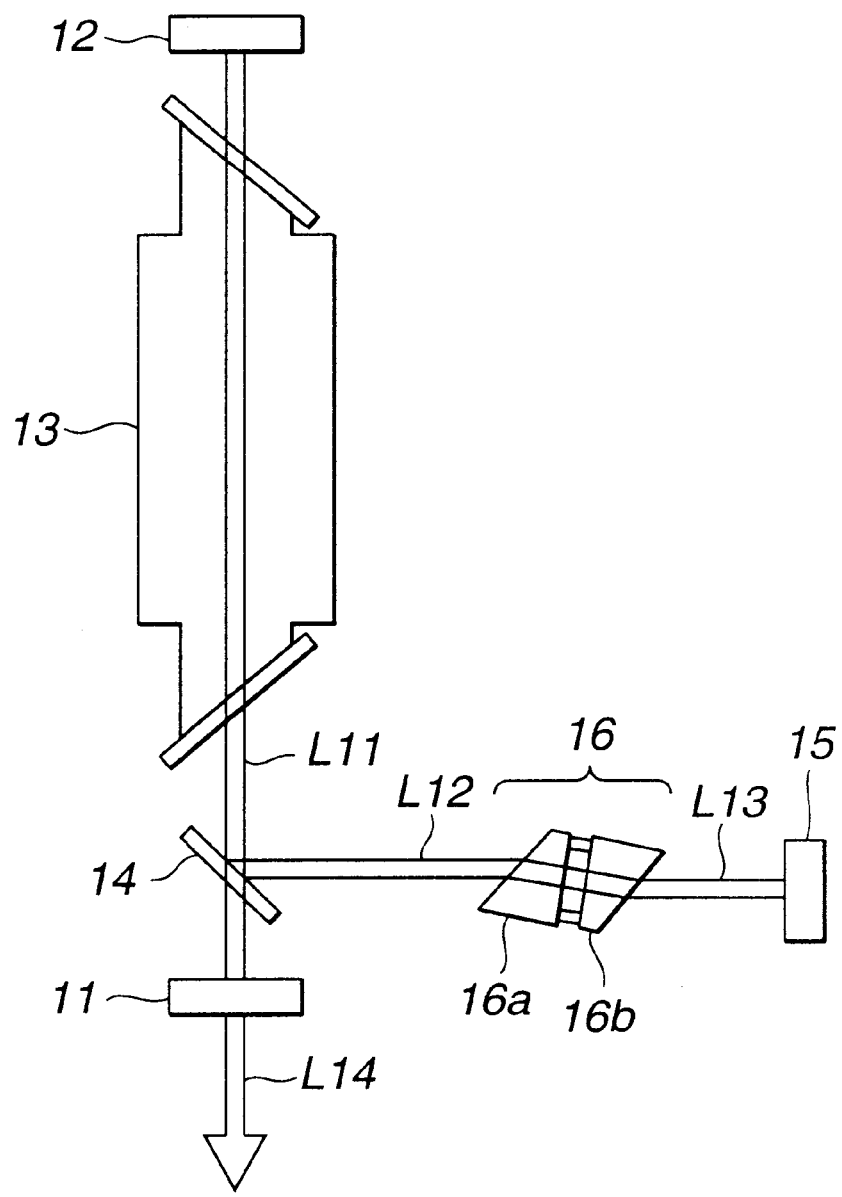
FIG. 1 is a schematic diagram showing the scheme of an ultra narrow band fluorine laser apparatus pertaining to a first embodiment.

FIG. 1 is a schematic diagram showing the scheme of an ultra narrow band fluorine laser apparatus 100 pertaining to the invention.

It is assumed that, in this ultra narrow band fluorine laser apparatus 100, band narrowing of laser light from a fluorine laser is performed by a wavelength selection element (this shall be described later). The fluorine laser has two strong oscillation lines (oscillation lines) of different wavelengths and light intensities. Specifically, these are an oscillation line of wavelength $\lambda 1=157.6299$ nm (hereinbelow referred to as strong line L1) and an oscillation line of wavelength $\lambda 2=157.5233$ nm (hereinbelow referred to as weak line L2). Here, it shall be assumed that strong line L1 is selected (hereinbelow referred to as single line mode) and that the laser light thereof is subjected to band narrowing.

The wavelength selection element is a band narrowing element constituting an optical element with cyclically varying transmittance (or reflectivity) for each of a number of essentially given wavelengths. That is, in the wavelength selection element there is afforded in a cyclical manner maximum transmittance for each given wavelength, for example. The wavelength transmitted at maximum transmittance is termed the "maximum transmission wavelength." The cycle affording, for example, maximum transmittance in the wavelength selection element is termed the "FSR." As used herein, wavelength selection elements include etalons, mode selectors, and so on. Maximum transmission wavelength can also be expressed as selected wavelength.

The following description refers to FIG. 1. In ultra narrow band fluorine laser apparatus 100, a laser chamber 13 is situated within a stable resonator composed of an output mirror 11 and a total reflection mirror 12. A no-coat (no coating) beam splitter 14 is interposed in the resonator, and on the optical path between this beam splitter 14 and a mirror 15 is positioned as the wavelength selection element an etalon 16 having a pair of edge plates 16*a*, 16*b* with mutually opposing edge directions. Etalon 16 has a cycle (FSR) of 3.0 pm and finesse of 15.

The edge angles of edge plates 16*a*, 16*b* of etalon 16 are preferably such that the faces at which laser light is incident on etalon 16 assume Brewster's angle (about 57°), since this gives negligible reflection loss.

Excitation of fluorine laser gas in laser chamber 13 by an electric discharge results in spontaneous photoemission, principally at the two (strong and weak) lines (lines of different wavelengths and light intensities), which light increases in intensity as it travels about within the resonator.

Some of the laser light emitted from laser chamber 13 is reflected by beam splitter 14 and transmitted through etalon 16; the transmitted laser beam L13 is reflected by mirror 15 and again transmitted through etalon 16. A portion of the transmitted laser beam is then reflected by beam splitter 14 and directed into laser chamber 13, thereby increasing the proportion of the strong line L1 band-narrowed by etalon 16.

Accordingly, the laser sets up with the strong line L1 exclusively, whereby there is obtained from output mirror 11 a laser beam L14 consisting exclusively of the strong line L1 and having bandwidth of about 0.2 pm.

Figure 2:
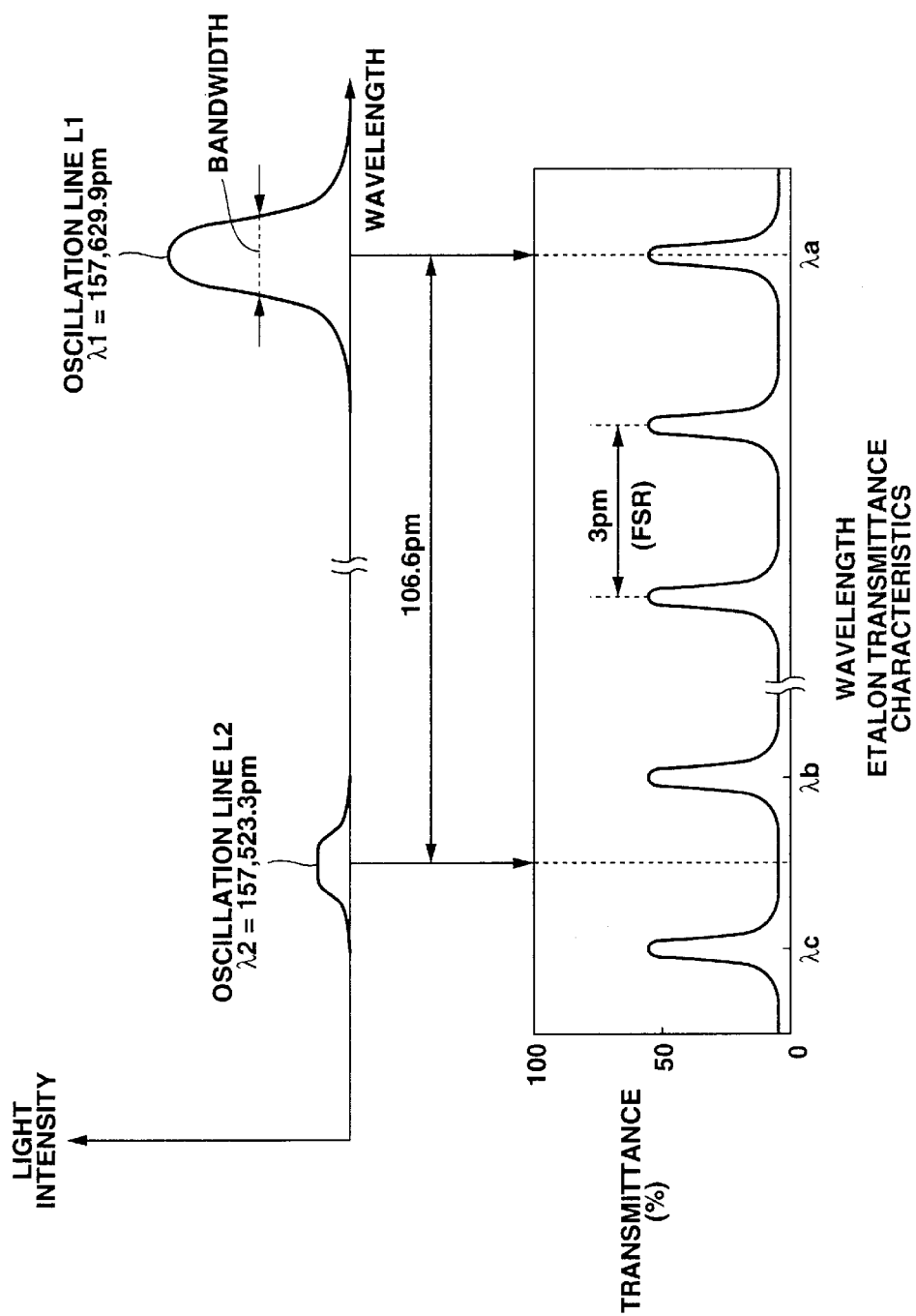
FIG. 2 is an explanatory diagram explaining oscillation line selection method.

Referring to FIG. 2, in etalon 16, maximum transmission wavelength λa is matched with the center of the 157.6299 nm λ1 wavelength strong line L1. As a result, the laser beam L12 incident on etalon 16 from beam splitter 14, upon passing through etalon 16 (i.e., laser beam L13), assumes peak power of about 50% at the center wavelength of the strong line L1, with bandwidth (spectrum width) thereof being about 0.2 pm, ⅕ the original line width (spectrum width).

Dividing the wavelength differential of the two lines of the fluorine laser of 106.6 pm (=157,629.9 pm–157,523.3 pm) by the FSR of 3.0 pm gives a value of 35.53, so transmittance at the 157.5233 nm λ2 wavelength is on the order of several per cent.

That is, since the decimal part of the value 106.6/FSR (35·53) is 0.53, in etalon 16 affording maximum transmittance at the 157,629.9 nm λ1 wavelength, the 157,523.3 nm λ2 wavelength is substantially medial with respect to two adjacent maximum transmission wavelengths λb, λc, as shown in FIG. 2. Thus, since etalon 16 produces large loss for the 157.5233 nm λ2 wavelength weak line L2, laser beam L13 has a strong line L1 component of 90% or greater with bandwidth of about 0.2 pm.

The above maximum transmission wavelengths λa, λb, λc are also selected wavelengths.

Etalon 16, the wavelength selection element in the present embodiment, may be used in place of output mirror 11. In this case, reflectivity is high at wavelengths with low transmittance in etalon 16, so oscillating the laser is a simple matter. Thus, while selected wavelength is the opposite of the arrangement of FIG. 1, when adjustment is performed so as give laser emission at wavelength λ1, reflectivity at wavelength λ2 drops, so laser emission is inhibited regardless of feedback control.

Where the etalon used as the wavelength selection element of the invention is employed in place of output mirror, it will be necessary to employ an etalon of specifications giving close to 100% transmittance at the unselected wavelength in order to completely inhibit laser emission; for this reason, it will be necessary to use a low-finesse etalon having minimum transmittance of about 90% (maximum reflectance of about 10%). An assembly of two non-coated substrates not subjected to reflective coating on the inside faces of the etalon is suitable for this purpose. Long term stability is afforded as an additional benefit, since the need for easily-damaged reflective coatings is obviated.

Quantitative specifications for the wavelength selection element are discussed below.

In a fluorine laser, there is a delay of about 20 ns from the instant that the fluorine laser gas is actually excited until laser oscillation (i.e., the elapsed time from discharge energy injection to observable laser light); conversion of this time interval to distance gives a light travel distance of about 6 m.

Since this is about 4 times the typical resonator length of 1 to 1.5 m in a fluorine laser apparatus, the faint light "seed" travels back and forth 2 to 3 times in the laser resonator. Thus, the seed (faint light) travels back and forth 2 to 3 times in an etalon or other wavelength selection element before the laser is oscillated.

The intensity ratio of the two lines of a fluorine laser is the to be such that the weak line L2 is about ⅙ to ⅐ the strong line L1. In consideration of this intensity ratio, in order that the faint light traverse the etalon or other wavelength selection element at least twice (i.e., pass through the element at least four times) so that intensity at the center wavelength of weak line L2 drops to 1% or less the intensity at the center wavelength of strong line L1 (in this case, an intensity level that is immaterial during the actual exposure process), the transmittance ratio at the wavelength selection element is appropriately one such that transmittance at the center wavelength of weak line L2 is (⅙)^(¼)={(⅙) to the (¼) power}≧0.64 times transmittance at the center wavelength of strong line L1.

That is, characteristics (specifications) for the wavelength selection element are dependent on transmittance characteristics (in the case of an etalon, determined by the reflectivity and planarity of the reflective layer, etc.); in the present embodiment, these are established such that transmittance at the center wavelength of weak line L2 is about 0.64 times or less the transmittance at the center wavelength of strong line L1.

A fluorine exposer employing the ultra narrow band fluorine laser apparatus 100 described above is now discussed.

Figure 3:
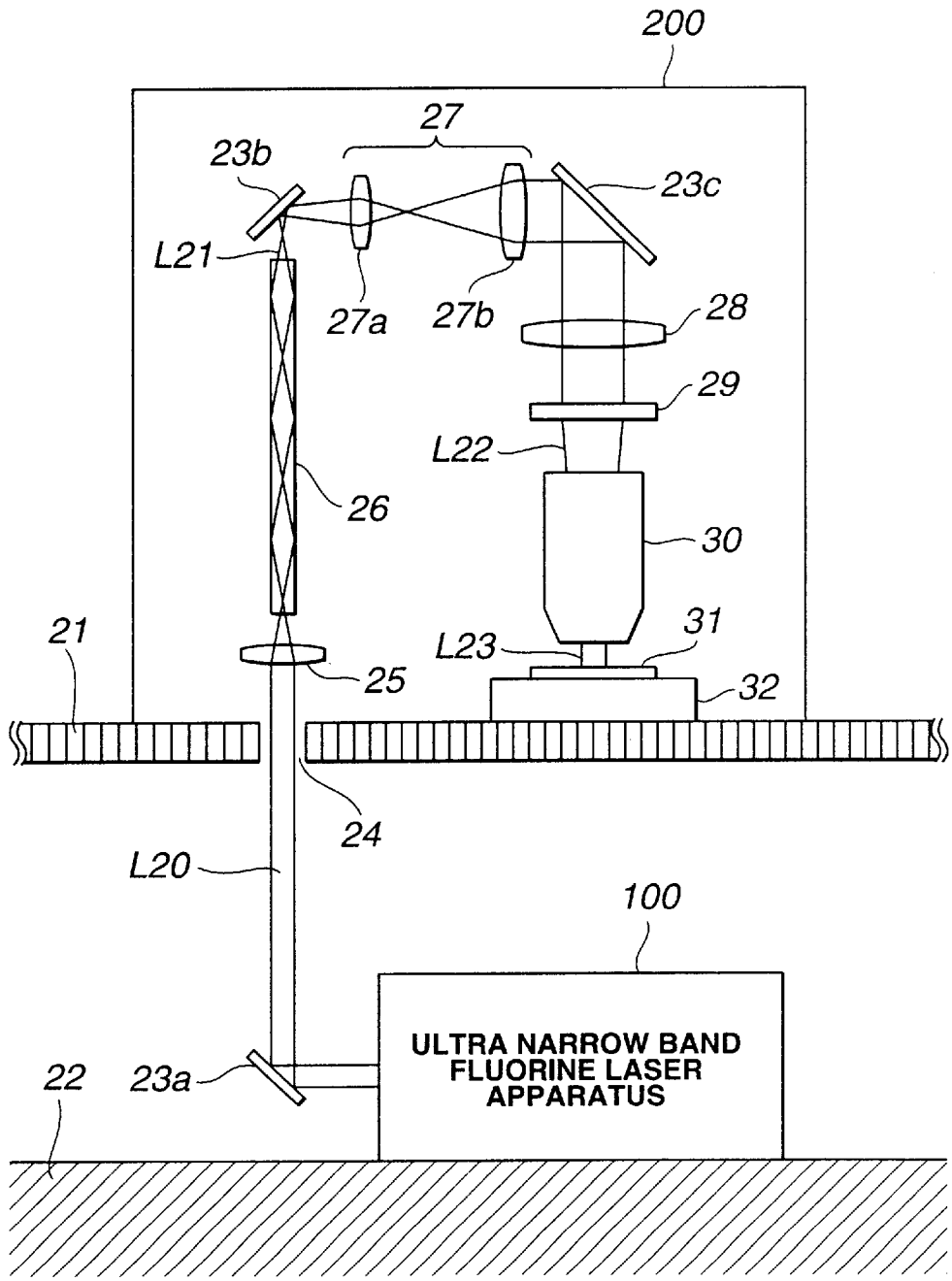
FIG. 3 is a schematic diagram showing the scheme of a fluorine exposer using an ultra narrow band fluorine laser apparatus.

FIG. 3 is a schematic diagram showing the scheme of a fluorine exposer 300.

As shown in the figure, fluorine exposer 300 is broadly composed of the ultra narrow band fluorine laser apparatus 100 described in FIG. 1, and an exposer main body 200.

Exposer main body 200 is arranged on a grating 21 in a cleanroom, while ultra narrow band fluorine laser apparatus 100 is arranged on a floor bed 22 (typically termed a "subfloor") situated below grating 21.

The laser beam L20 obtained from ultra narrow band fluorine laser apparatus 100, which consists exclusively of the strong line L1 with bandwidth of approximately 0.2 pm, is reflected upward by a mirror 23a so as to pass through an aperture 24 in grating 21 and into exposer main body 200.

Laser beam L20 is narrowed by lens 25, proceeds into a glass rod 26 comprising calcium fluoride, and through repeated total reflection within glass rod 26 emerges from glass rod 26 as a laser beam L21 with uniform beam intensity distribution.

Laser beam L21 is reflected by mirror 23b and passed through a beam rectifier 27 composed of lenses 27a, 27b, whereby the cross section of the beam is expanded, and is then reflected by mirror 23c, passed through a condenser lens 28, and directed onto a reticle 29.

The laser beam L22 emerging from reticle 29 is passed through a reducing projection lens 30 and directed onto a wafer 31. That is, the pattern in reticle 29 is transferred onto wafer 31 by reducing projection lens 30, whereby reticle 31 is exposed in the pattern of reticle 29. Wafer 31 is carried on a stage 32.

The reducing projection lens 30 serving as the reducing projection optical system is composed of a monochromatic lens comprising calcium fluoride.

The reason why it is possible to use a lens-only reducing projection optical system (i.e., reducing projection lens 30) in fluorine exposer 300 is that the bandwidth of the laser beam L20 from ultra narrow band fluorine laser apparatus 100 is only 0.2 pm, about ⅕ that of a conventional fluorine laser, so chromatic aberration at reducing projection lens 30 is negligible.

Thus, conventional designs may be employed for the reducing projection lens, affording a significant reduction in the costs associated with design. That is, since conventional elements can be used as simulation tools, and design can be accomplished within a short time frame, human resource costs may be significantly reduced as well.

In the present embodiment, the decimal part of the value obtained by dividing the two line wavelength differential of 106.6 pm by the FSR of etalon 16 is 0.53, but in actual practice, band narrowing to bandwidth of about 0.2 pm is possible even where the decimal part diverges from the ideal value of 0.50 by about 0.3 to 0.4 (i.e., 0.50±0.3 to 0.4).

According to the embodiment described above, in ultra narrow band fluorine laser apparatus 100 it is possible to generate efficiently laser light of bandwidth narrowed to about 0.2 pm with the 157.6299 nm λ1 wavelength strong line L1 exclusively, without the use of prisms for producing a single line in the resonator.

In fluorine laser exposer 300 employing ultra narrow band fluorine laser apparatus 100, the only difference from a conventional KrF exposer is that calcium fluoride replaces quartz as the material for the lens of the reducing projection optical system (reducing projection lens 30), allowing conventional KrF exposer design to be used for the exposer main body 200.

Thus, a total refraction type reducing projection optical system can be employed without appreciably increasing fluorine laser apparatus cost or significantly reducing laser efficiency. The ability to design the reducing projection optical system analogously to that of a conventional KrF exposer allows a commercial fluorine exposure apparatus to be provided quickly and inexpensively.

Second Embodiment

Figure 4:
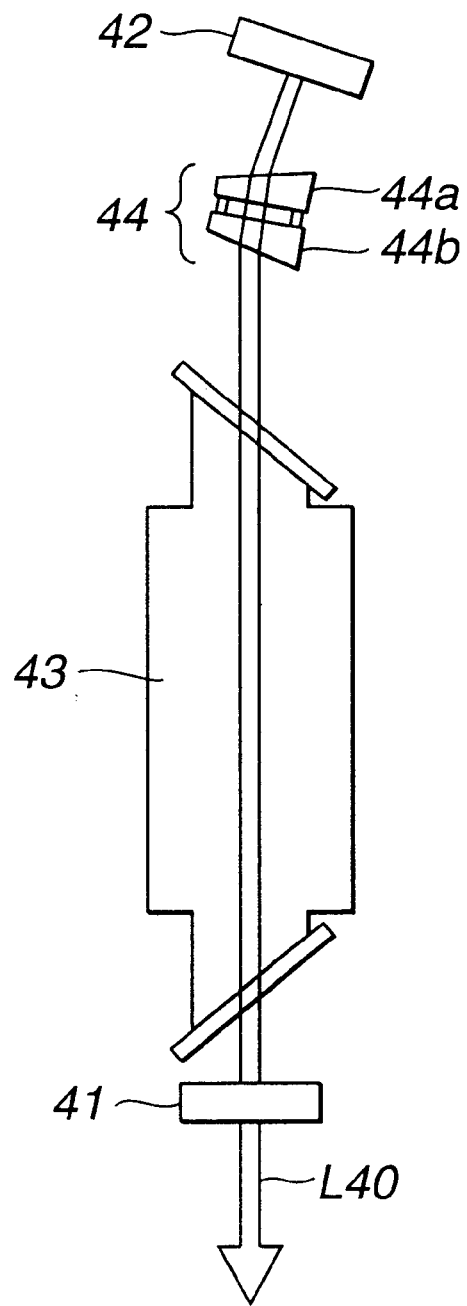
FIG. 4 is a schematic diagram showing the scheme of an ultra narrow band fluorine laser apparatus pertaining to a second embodiment.

FIG. 4 is a schematic diagram showing the scheme of an ultra narrow band fluorine laser apparatus 400 pertaining to a second embodiment.

As shown in the figure, in narrow band fluorine laser apparatus 400, a stable resonator is composed of an output mirror 41 and a total reflection mirror 42. Within this stable resonator are arranged a laser chamber 43 and an etalon 44 having the same function as the etalon 16 shown in FIG. 1. However, etalon 44 is composed of a pair of edge plates 44a, 44b, with the edges of these edge plates 44a, 44b being oriented in the same direction, so the function thereof is analogous to a dispersive prism.

As in the first embodiment described previously, in an ultra narrow band fluorine laser apparatus 400 of this design, excitation of fluorine laser gas in laser chamber 43 by an electric discharge results in spontaneous photoemission, principally at the two (strong and weak) lines L1, L2, which light increases in intensity as it travels about within the resonator.

Referring to FIG. 2, in etalon 44 the maximum transmission wavelength λa is matched to the center of the 157.6299 nm λ1 wavelength strong line L1, so the laser light emitted from laser chamber 43, after being transmitted through etalon 44, is reflected by a total reflection mirror 42, is again transmitted through etalon 44 and again directed into laser chamber 43.

The resultant laser beam has a bandwidth of about 0.2 pm at the center wavelength of the band narrowed strong line L1. This band narrowed laser beam passes through laser chamber 43 and passes through an output mirror 41, exiting as laser beam L43.

Since etalon 44 functions analogously to a dispersive prism (i.e., has a wavelength dispersing function), it is possible to further inhibit the weak line L2 (see FIG. 2), thus allowing for more latitude in the specification for single line mode by etalon 44.

That is, laser oscillation at the weak line L2 can be inhibited even where transmittance at the center wavelength of the weak line L2 is set to about 0.8 times transmittance at the center wavelength of the strong line L1 (although in principle a setting of 0.64 times or less is preferred). Accordingly, the reflectivity of the reflecting layer of etalon 44 can be rather low, on the order of 10%.

An assembly of two no-coated substrates not subjected to reflective coating can be employed as the etalon.

With a typical etalon having reflectivity of 10%, for example, transmittance, even at the minimum transmission wavelength, is about 60%, and with such an etalon a modicum of laser oscillation with the unwanted weak line L2 may occur. This creates a need to provide an additional prism as a countermeasure, but this has the effect of increasing insertion loss, so that the output of the desired strong line L1 drops as well.

In the second embodiment, however, the etalon 44 serving as the wavelength selection element has a wavelength dispersing function analogous to a prism, so laser oscillation with the weak line L2 may be inhibited.

This allows the use of a low-reflectivity or no-coat etalon 44 in ultra narrow band fluorine laser apparatus 100, and low-reflectivity reflecting films have the additional advantage of being resistant to damage, since the number of layers in the coating film is few to none.

Absent the use of such a low-reflectivity etalon 44, the coating film becomes susceptible to damage, particularly with a fluorine laser, since virtually all coating materials have high absorption at wavelength of 157 nm.

As described hereinabove, according to the second embodiment, the use of an etalon 44 having a wavelength dispersing function analogous to a prism affords band narrowing of oscillation laser light from a fluorine laser, thus affording greater reduction in the weak line L2 than does the etalon 16 discussed in the first embodiment.

The low-reflectivity reflecting film provided to etalon 44 has the advantage of resisting damage, thereby improving the long term stability of the wavelength selection element (i.e., etalon 44).

Third Embodiment

Figure 5:
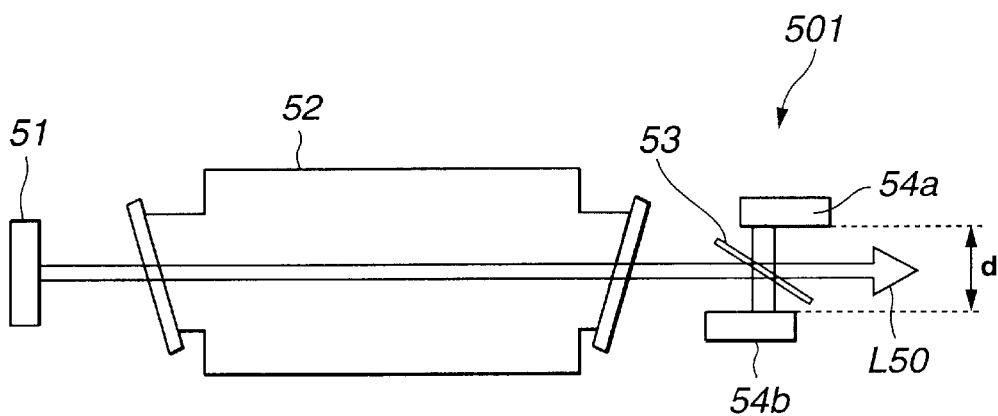
FIG. 5 is a schematic diagram showing the scheme of an ultra narrow band fluorine laser apparatus pertaining to a third embodiment.

FIG. 5 is a schematic diagram showing the scheme of an ultra narrow band fluorine laser apparatus 500 pertaining to a third embodiment.

As shown in the figure, in ultra narrow band fluorine laser apparatus 500, a stable resonator surrounding a laser chamber 52 is composed of a total reflection mirror 51 and a mode selector 501. Mode selector 501 is composed of a beam splitter 53 having a beam splitting action, and two reflecting mirrors 54a, 54b. This mode selector 501 is the wavelength selection element and functions analogously to an output mirror for outputting laser light of the selected wavelength.

In mode selector 501, where d is the gap (more accurately, the optical path length) between reflecting mirror 54a and reflecting mirror 54b, the mode selector 501 cycle (FSR) is expressed as $\lambda^2/(2nd)$, where n=1.

In this embodiment, since d=12.3 mm, FSR is 1.01 pm; as a result, 106.6/1.01=105.5.

In an ultra narrow band fluorine laser apparatus 500 of this design, excitation of fluorine laser gas in laser chamber 52 by electric discharge results in spontaneous photoemission, principally at the two (strong and weak) lines L1, L2, which light increases in intensity as it travels about within the resonator.

In mode selector 501 impinged upon by laser light from laser chamber 52, a portion of this laser light is passed through beam splitter 53, while another portion of the laser light is reflected by beam splitter 53 and then reflected by reflecting mirror 54b.

A portion of the laser light reflected by reflecting mirror 54b is reflected by beam splitter 53 or passes through beam splitter 53. The laser light reflected by beam splitter 53 is again directed into laser chamber 52, while laser light passing through beam splitter 53 is reflected by reflecting mirror 54a.

Laser light reflected by reflecting mirror 54a is then reflected by beam splitter 53 and output as a laser beam L50; a portion of the laser light reflected by reflecting mirror 54a passes through beam splitter 53 and is reflected by reflecting mirror 54b.

By repeating this operation, as laser light is directed into laser chamber 52, the proportion of narrow band strong line L1 in the laser light increases, and is then output from beam splitter 52.

That is, since 106.6/1.01=105.5, tuning to the 157.6299 nm λ1 wavelength strong line L1 by mode selector 501 suppresses the 157.5233 nm λ2 wavelength weak line L2, whereby a 157.6299 nm λ1 wavelength laser beam L50 is obtained from beam splitter 53.

According to the third embodiment described hereinabove, a mode selector 501 (wavelength selection element) composed of means having a beam splitting face (beam splitter 53) and two means having reflecting faces (reflecting mirrors 54a, 54b) can be used as the wavelength selection element, and an uncoated calcium fluoride component plate can be used as mode selector 501.

Thus, in mode selector 501, beam splitter 53 suffers substantially no damage, and since the reflecting films of reflecting mirrors 54a, 54b are total reflection films, they are more resistant to damage than are the partial reflection films used in a typical etalon.

Thus, mode selector 501 affords band narrowing of oscillation laser light without damage and with stability for an extended period, making it a simple matter to achieve a viable ultra narrow band fluorine laser.

In a laser (particularly a fluorine laser) apparatus that does not employ such a mode selector, since power is higher, wavelength is shorter, and absorption by virtually all optical materials is higher than with an excimer laser, when an etalon requiring partial reflection films is used, the partial reflection films become susceptible to damage.

In the ultra narrow band fluorine laser apparatus of the third embodiment, it is advantageous to arrange the fluorine exposure apparatus employing same as its light source on a line extended along the lengthwise axis of the laser chamber in the ultra narrow band fluorine laser apparatus.

Fourth Embodiment

Figure 6:
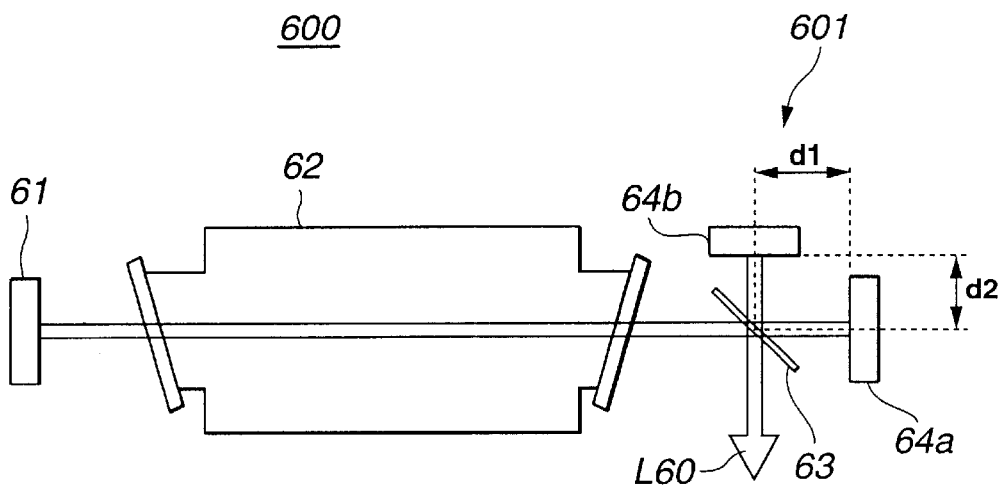
FIG. 6 is a schematic diagram showing the scheme of an ultra narrow band fluorine laser apparatus pertaining to a fourth embodiment.

FIG. 6 is a schematic diagram showing the scheme of an ultra narrow band fluorine laser apparatus 600 pertaining to a fourth embodiment.

As shown in the figure, in ultra narrow band fluorine laser apparatus 600, an oscillator surrounding a laser chamber 62 is composed of a total reflection mirror 61 and a mode selector 601. Mode selector 601 is composed of a beam splitter 63 and two reflecting mirrors 64a, 64b.

The mode selector 601 cycle (FSR) is expressed as λ2/(2n(d1+d2)), where n=1, d1 is the gap between beam splitter 63 and reflecting mirror 64a and d2 is the gap between beam splitter 63 and reflecting mirror 64b.

In this embodiment, since (d1+d2)=12.3 mm, FSR is 1.01 pm, as in the preceding third embodiment.

In an ultra narrow band fluorine laser apparatus 500 of this design, excitation of fluorine laser gas in laser chamber 62 by electric discharge results in spontaneous photoemission, principally at the two (strong and weak) lines L1, L2, which light increases in intensity as it travels about within the resonator.

In mode selector 601 impinged upon by laser light from laser chamber 62, a portion of this laser light is reflected by beam splitter 63 and output as a laser beam L60. A portion of the laser light from laser chamber 62 passes through beam splitter 63 and is reflected by reflecting mirror 64a.

The portion of the laser light reflected by reflecting mirror 64a passes through beam splitter 63 and is again directed into laser chamber 62 or reflected by beam splitter 63 and then reflected by reflecting mirror 64b. The portion of laser light reflected by reflecting mirror 64b is again reflected by beam splitter 63, or passes as-is through beam splitter 63. This operation is subsequently repeated.

That is, since, as mentioned in the context of the third embodiment, 106.6/1.01=105.5, tuning to the 157.6299 nm λ1 wavelength line L1 suppresses the 157.5233 nm λ2 wavelength weak line L2, whereby a 157.6299 nm λ1 wavelength laser beam L60 is obtained from beam splitter 63.

As described hereinabove, according to the fourth embodiment, the working effect is analogous to the working effect of the third embodiment described previously. For example, it is possible to use a mode selector 601 as the wavelength selection element and an uncoated calcium fluoride component plate as mode selector 601.

Thus, mode selector 601 affords band narrowing of oscillation laser light without damage and with stability for an extended period. It is therefore a simple matter to achieve a viable ultra narrow band fluorine laser whose optical system is resistant to damage.

In the ultra narrow band fluorine laser apparatus of the fourth embodiment, it is advantageous to arrange the fluorine exposure apparatus employing same as its light source on a line perpendicular to the lengthwise axis of the laser chamber in the ultra narrow band fluorine laser apparatus.

Fifth Embodiment

Figure 7:
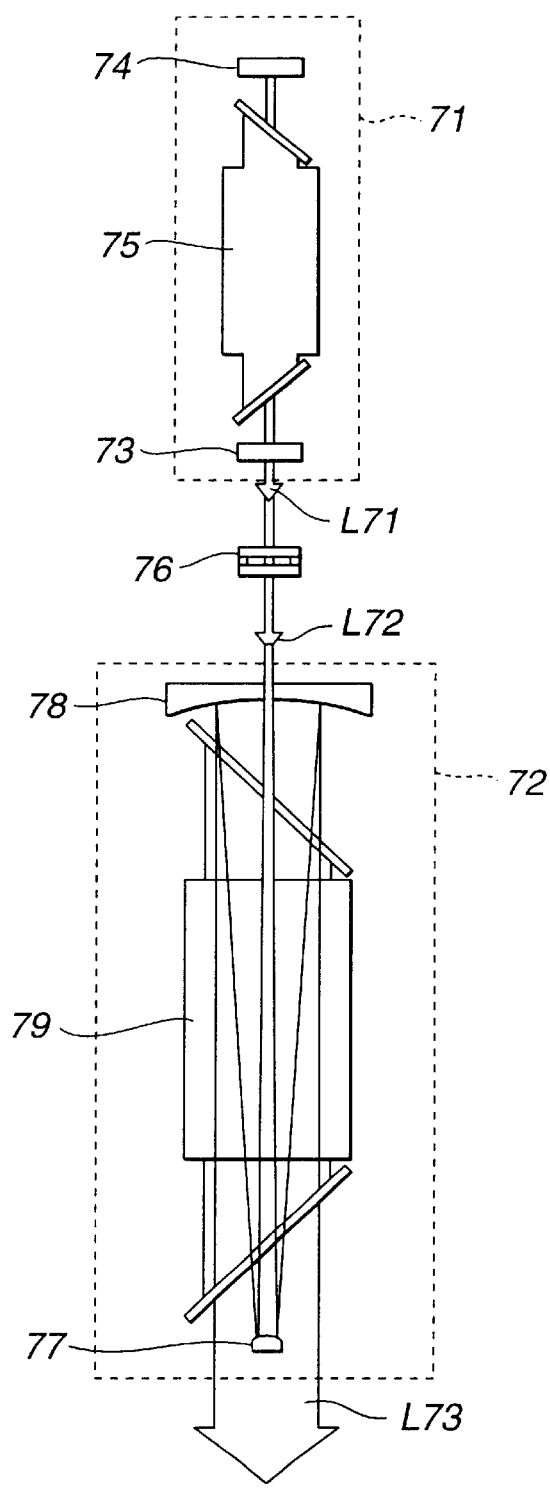
FIG. 7 is a schematic diagram showing the scheme of an ultra narrow band fluorine laser apparatus pertaining to a fifth embodiment.
Figure 8A:
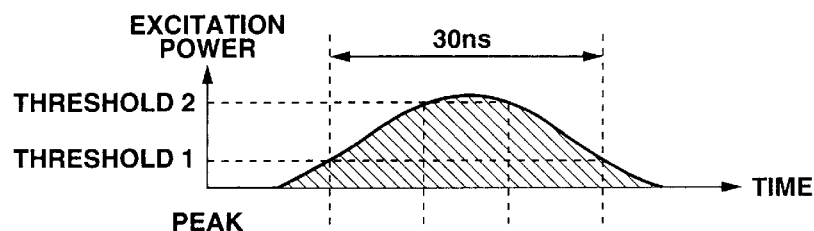
FIGS. 8(*a*, to 8(*e*) are pulse waveform diagrams illustrating action of the ultra narrow band fluorine laser apparatus pertaining to the fifth embodiment.
Figure 8B:
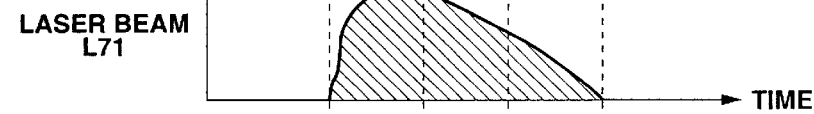
Figure 8C:
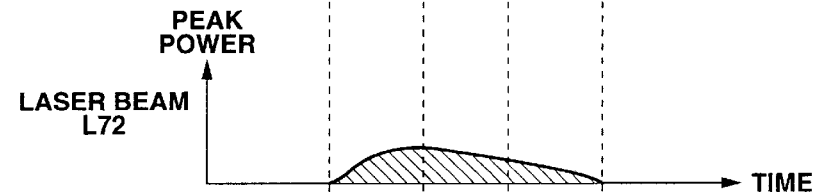
Figure 8D:
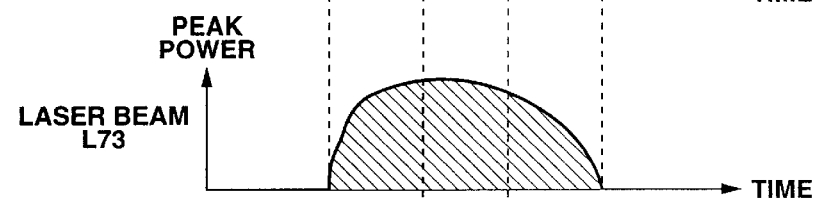
Figure 8E:
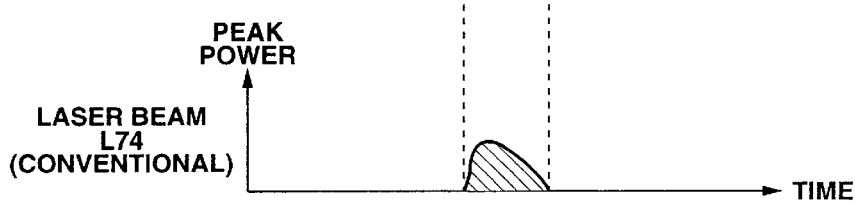

FIG. 7 is a schematic diagram showing the scheme of an ultra narrow band fluorine laser apparatus 700 pertaining to a fifth embodiment.

As shown in the figure, ultra narrow band fluorine laser apparatus 700 is of injection seeded type and is composed of a seed laser 71 and an oscillator 72, surrounded by broken lines in the figure.

Seed laser 71 is a stable resonator composed of an output mirror 73 and a total reflection mirror 74 arranged to either side of a laser chamber 75. No band narrowing element is present within the stable resonator. Accordingly, the laser beam L71 from seed laser 71 contains both strong and weak lines L1, L2, with both lines being un-narrowed at bandwidth of about 1 pm.

Laser beam 71 passes through an etalon 76, a wavelength selection element situated to the outside of seed laser 71. As with the etalon 16 described in the context of the first embodiment, the characteristics of etalon 76 are an FSR of 3.0 pm and finesse of 15.

Thus the laser beam L72 passing through etalon 76 is narrowed to bandwidth of 0.2 pm and consists of a single line only, as in the preceding first embodiment.

The energy of laser beam L72 is about 1/10 lower than that of laser beam L71. The narrowed laser beam L72 proceeds to an oscillator 72, the second fluorine laser apparatus.

Oscillator 72 is an unstable resonator composed of an apertured concave mirror 78 and a convex mirror 77, arranged surrounding laser chamber 79.

This laser beam L72 is injected as seed light into the resonator via the aperture in apertured concave mirror 78. As laser beam L72 discharges during passage through laser chamber 79, there is obtained a laser beam L73 having the same bandwidth but increased power.

Specifically, the laser beam L72 injected into the resonator is reflected by convex mirror 77, reflected by apertured concave mirror 78, and then output as laser beam L73.

Thus, laser beam L73 is single line with bandwidth of about 0.2 pm and has sufficient output. This is guided to the exposer main body for use as exposure light.

The effects of locating etalon 76 outside seed laser 71 are now discussed making reference to FIGS. 8(*a*) to 8(*e*).

Laser beams L71–L73 shown in FIGS. 8(*b*), 8(*c*) and 8(*d*) correspond respectively to laser beams L71–L73 in FIG. 7.

FIG. 8(*a*) shows excitation power level in laser chamber 75 in seed laser 71, and shows laser oscillation once the threshold for laser oscillation is passed.

Since seed laser 71 does not have a band narrowing element, internal loss is minimal. As shown in FIG. 8(*a*), during the period that the excitation power level exceeds threshold 1, a laser beam L71 is emitted (see FIG. 8(*b*)). Total pulse width is about 30 ns.

When this laser beam L71 passes through etalon 76 (becoming laser beam L72), peak power drops, so energy is ¹⁄₁₀ that of laser beam L71, as shown in FIG. 8(*c*).

However, since the lower-energy laser beam L72 is not used directly for exposure but rather used as seed light in oscillator 72, moderately low output by seed laser 71 is acceptable.

That is, since the laser beam L73 employed in actual exposure is generated in oscillator 72, there is sufficient energy, as with laser beam L71, as shown in FIG. 8(*d*).

In contrast, supposing for an instant that seed laser 71 per se were subjected to band narrowing to bandwidth of 0.2 pm, it would be necessary to insert an etalon or the like within the resonator. The resultant insertion loss would mean a higher threshold for laser oscillation.

That is, since laser emission occurs only for the period during which threshold 2 shown in FIG. 8(*a*) is exceeded, the pulse width is shorter than is the pulse in the case of threshold 1, as shown in FIG. 8(*e*) (this becomes laser beam L74), When laser beam L74 of shorter pulse width is injected as seed light into oscillator 72, there is substantially no locking, so bandwidth in the laser beam from oscillator 72 spreads to about 2 pm, about the same as with spontaneous oscillation. Set up occurs with the two lines L1, L2.

That is, during laser oscillation by oscillator 72, locking occurs only for the brief time interval that laser beam L74, the seed light, passes through. Locking refers to the phenomenon of the spectrum of the laser beam emitted by the second laser apparatus becoming narrowed analogously to the seed light.

In this fifth embodiment, on the other hand, an un-narrowed burst of laser light obtained from seed laser 71 is subjected to band narrowing by etalon 76, so the un-narrowed laser light, while having lower power, will have sufficient pulse sustain time. This affords highly efficient locking in resonator 72.

The ultra narrow band fluorine laser apparatus of the preceding fifth embodiment is of so-called injection seeded type wherein an etalon is arranged between the oscillating stage and the amplifying stage. However, the invention is not limited to this arrangement, and may be implemented in an oscillating amplifier, or a fluorine laser apparatus comprising an oscillating stage and amplifying stage to a single discharge tube.

That is, in these laser apparatuses, the etalon may be arranged between the oscillating stage and amplifying stage.

As described hereinabove, according to the fifth embodiment, in an ultra narrow band fluorine laser apparatus composed of an oscillating stage (seed laser 71) and an amplifying stage (oscillator 72), a wavelength selection element (etalon 76) is arranged between the oscillating stage and amplifying stage, whereby no band narrowing occurs in the oscillating stage, and laser light having sufficient pulse width is produced. Accordingly, energy is obtained with high efficiency in the oscillating stage.

That is, when the second fluorine laser apparatus constitutes the exposure light source for the fluorine exposer, by arranging the etalon serving as the wavelength selection element on the optical path outside the resonator of the first laser apparatus, it becomes possible to obtain from the etalon single line laser light whose bandwidth has been narrowed to about 0.2 pm, generated with sufficient pulse width. By injecting this seed light into the oscillator constituting the second laser apparatus, laser light narrowed to a single line is obtained at high output.

There is now described a fluorine exposure apparatus and ultra narrow band fluorine laser apparatus capable of accurately calibrating the wavelength of laser light from a fluorine laser wherein a line of, for example, wavelength $\lambda 1 = 157.6299$ nm with bandwidth of from 1–2 pm is narrowed to about 0.2 pm.

Sixth Embodiment

Figure 9:
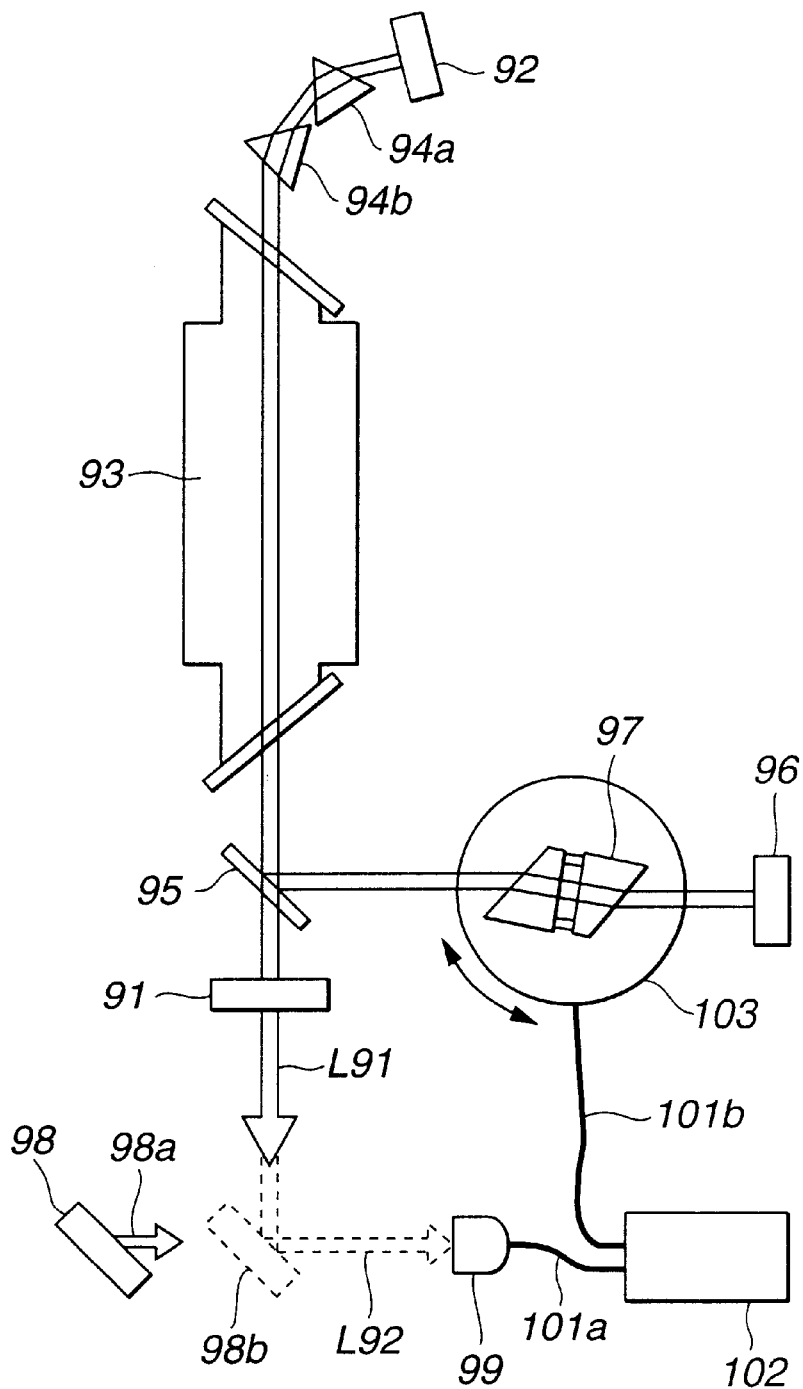
FIG. 9 is a schematic diagram showing the scheme of an ultra narrow band fluorine laser apparatus pertaining to a sixth embodiment.

FIG. 9 is a schematic diagram showing the scheme of an ultra narrow band fluorine laser apparatus 900 pertaining to a sixth embodiment.

It is assumed that in ultra narrow band fluorine laser apparatus 900 band narrowing of laser light from a fluorine laser is accomplished by a wavelength selection element. As in the ultra narrow band fluorine laser apparatus 100 shown in FIG. 1, this fluorine laser has two strong oscillation lines (oscillation lines) of different wavelengths and light intensities, i.e., a strong line L1 of wavelength $\lambda 1 = 157.6299$ nm and a weak line L2 of wavelength $\lambda 2 = 157.5233$ nm. Here, the laser light is narrowed to a single line.

The following description makes reference to FIG. 9. In ultra narrow band fluorine laser apparatus 900, the resonator is composed of an output mirror 91 and a total reflection mirror 92. A laser chamber 93 and prisms 94*a*, 94*b* for producing a single line are arranged in the resonator.

A beam splitter 95 is inserted in the resonator, and an etalon 97 having a pair of edge plates with mutually opposing edge directions is arranged as the wavelength selection element on the optical path between beam splitter 95 and a mirror 96.

A mirror 98 is moved in the direction of the arrow indicated in the figure by symbol 98*a* (i.e., rightward in the figure) under movement control by a control portion, not shown, and is halted at the position needed to guide laser beam L91 from output mirror 91 into power monitor 99, for example, the position indicated in the figure by symbol 98*b*.

Power monitor 99 monitors the output of the laser beam L92 reflected by mirror 98 halted at the position indicated by symbol 98*b*.

On the basis of the monitoring outcome of power monitor 99, a control unit 102 controls rotation of a rotating stage 103 via a signal line 101b.

As rotating stage 103 rotates, etalon 97, which is fixed to rotating stage 103, rotates in association therewith.

For carrying out exposure processing of a wafer, when mirror 98 is not present at the position indicated by symbol 98b, a portion of the laser light emitted from laser chamber 93 passes through beam splitter 95 and output mirror 91, with a portion of the laser light being reflected by beam splitter 95 and transmitted through etalon 97, this transmitted light being reflected by mirror 96 and again transmitted through etalon 97. A portion of the laser light transmitted through etalon 97 is reflected by beam splitter 95 and again directed into laser chamber 93.

The laser light directed into laser chamber 93 passes through prism 94b, prism 94a and is reflected by total reflection mirror 92. This reflected laser light passes through prism 94a, prism 94b and is again directed into laser chamber 93.

By repeating this operation, oscillated laser light is rendered into single line mode by prism 94a, prism 94b, and the laser beam L91 band narrowed by etalon 97 is output from output mirror 91. That is, there is obtained from output mirror 91 a single-line, band narrowed laser beam L91 having bandwidth of about 0.2 pm.

In this embodiment, there operates a mechanism for calibrating the wavelength of laser beam L91 to the center of strong line L1 at fixed intervals.

Specifically, when a wafer is not being subjected to an exposure process (when a wafer is not being irradiated with laser light), mirror 98 is moved in the direction of the arrow indicated in the figure by symbol 98a (i.e., rightward in the figure) under movement control by a control portion, not shown, and is halted at the position indicated by symbol 98b.

As a result, the laser beam L91 from output mirror 91 is reflected by mirror 98 and proceeds in the direction of laser beam L92 indicated by the broken lines to reach power monitor 99. Power monitor 99 detects the output of laser beam L92 and sends a signal reflecting this finding (monitoring outcome) to a control unit 102 via a signal line 101a.

On the basis of the signal received from power monitor 99, control unit 102 performs rotation control of rotating stage 103 via a signal line 101b. That is, while rotating etalon 97 in small increments by performing rotation control of a rotating stage 103, control unit 102 measures the output of laser beam L92.

In this way, laser beam L92 output values for various setting angles of etalon 97 are measured, giving a characteristics graph (profile curve) of measured output values (relative values) versus etalon 97 setting angle. This setting angle corresponds to the angle of rotation when rotating stage 103 is rotated from a pre-established reference position for etalon 97. This setting angle also corresponds to the angle of incidence of laser light from beam splitter 95 onto etalon 97.

Figure 10:
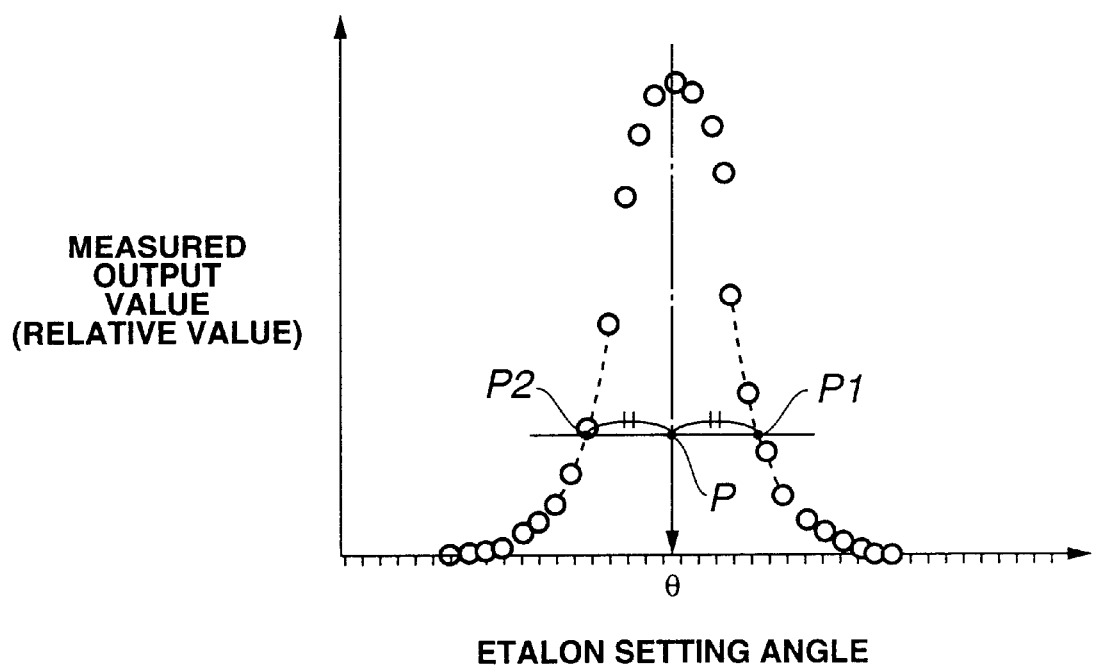
FIG. 10 is an explanatory diagram explaining wavelength calibration.

An example of this profile curve (characteristics graph) is shown in FIG. 10. In FIG. 10, the vertical axis gives measured output values (relative values) and the horizontal axis gives etalon 97 setting angle. A profile curve like that shown in FIG. 10 is developed in memory by control unit 102.

As shown in FIG. 10, in this profile curve, connecting the measured output values gives a laterally symmetrical peak waveform, so etalon setting angle at the maximum output value may be calculated on the basis of this curve. In actual practice, however, control unit 102 computes a setting angle θ corresponding to a medial location between the sloping lines on either side of the profile curve (peak waveform), for example, to a medial point P lying midway between point P1 and point P2.

By rotating the rotating stage 103, i.e., etalon 97, to give this setting angle θ, the wavelength of laser beam L91 is matched with the center wavelength of strong line L1.

The profile (curve) described above is a profile of the wavelength-dependence of laser output for the single line, since the laser beam is monitored while varying the wavelength selected by the wavelength selection element. This profile (curve) reflects the spectral characteristics of molecular fluorine, and the center wavelength of the profile curve is absolute.

Since the wavelength giving maximum laser output is thus fixed, the wavelength (absolute wavelength) of laser light can be calibrated through matching laser light wavelength with the center wavelength of the profile curve.

Once the optimal setting angle θ for etalon 97 has been calculated in this way, mirror 98 (currently positioned at symbol 98b) moves back to its original position so that laser beam L91 irradiates the wafer.

In the present embodiment, the angle of incidence of laser light incident on etalon 97 is varied by rotating rotating stage 103 (i.e., etalon 97), but the embodiment is not limited to this arrangement, it being alternatively possible, for example, to have etalon 97 be stationary and vary the tilt (inclination) of beam splitter 95 in order to vary the angle of incidence of laser light incident on etalon 97.

According to the present embodiment described hereinabove, during intervals in which laser beam L91 is not being used for exposure, a profile curve representing output characteristics of etalon 97 is produced, whereby an optimal setting angle for etalon 97 giving maximum laser output can be calculated on the basis of this curve, and the position of etalon 97 can be reset to this optimal setting angle.

Specifically, the wavelength of the laser beam irradiating the wafer (laser beam L91) is matched with the center wavelength of the strong line (the line of wavelength $\lambda 1 = 157.6299$ nm). This means that the wavelength of the laser beam irradiating the wafer can be calibrated accurately so as to match the center wavelength of the strong line.

Seventh Embodiment

Figure 11:
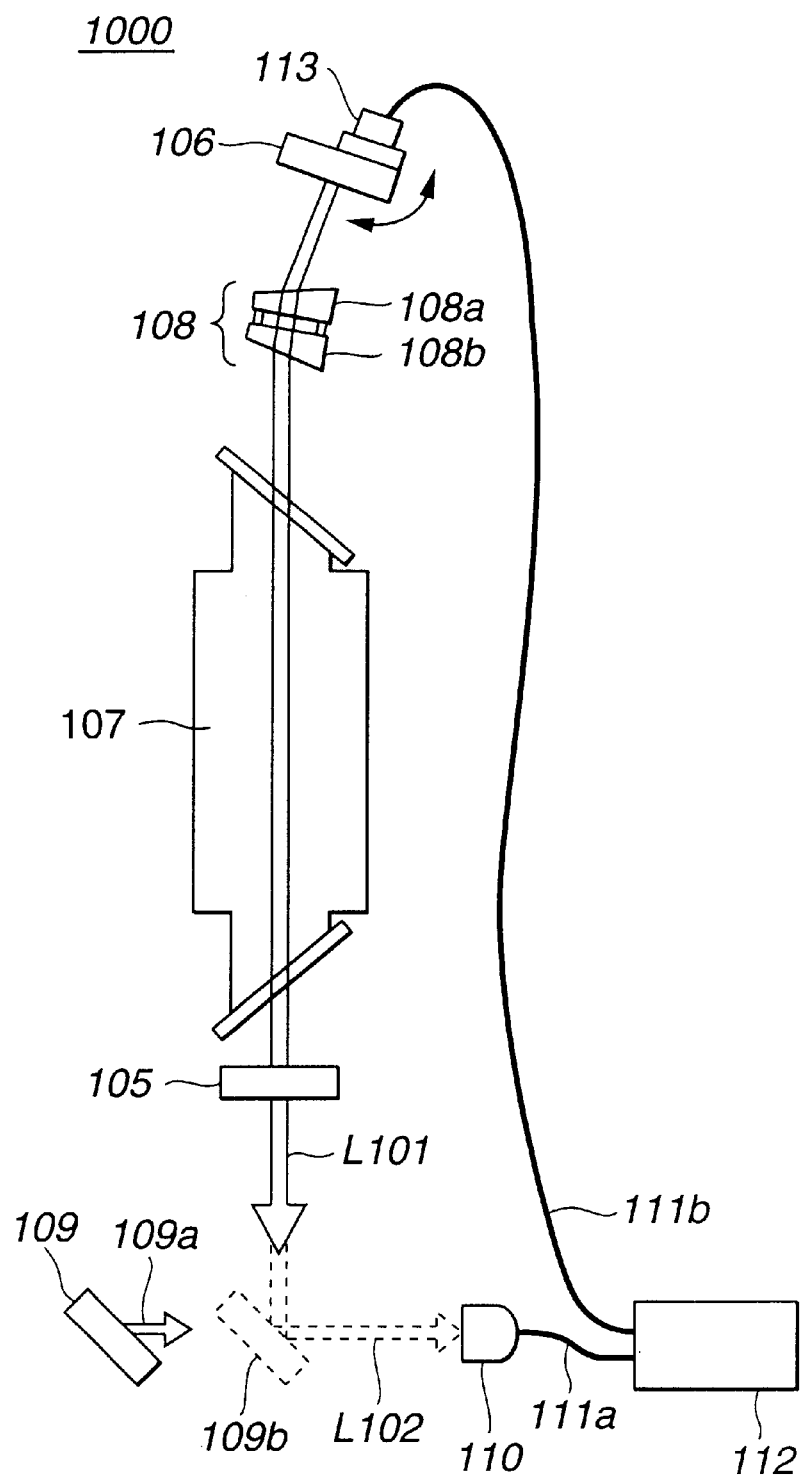
FIG. 11 is a schematic diagram showing the scheme of an ultra narrow band fluorine laser apparatus pertaining to a seventh embodiment.

FIG. 11 is a schematic diagram showing the scheme of an ultra narrow band fluorine laser apparatus 1000 pertaining to a seventh embodiment.

As shown in the figure, in ultra narrow band fluorine laser apparatus 1000, a stable resonator is composed of an output mirror 105 and a total reflection mirror 106. Within this stable resonator are arranged a laser chamber 107 and an etalon 108 having the same function as the etalon 16 shown in FIG. 9.

However, in the present embodiment etalon 108 is composed of a pair of edge plates 108a, 108b, with the edges of these edge plates 108a, 108b having the same direction. As a result, etalon 108 functions analogously to a dispersive prism and has the effect of producing single line mode. Accordingly, no prisms are used in the stable resonator.

A mirror 109 and a power monitor 110 have the same functions as the mirror 98 and power monitor 99 shown in FIG. 9.

On the basis of a monitoring outcome from power monitor 110, control unit 112 controls via a signal line 111b a piezo element 113 attached to total reflection mirror 106.

Piezo element 113 slightly changes the tilt of total reflection mirror 106 under the control of control unit 112. That is, total reflection mirror 106 is rotated by a predetermined angle of rotation from a present position.

For carrying out exposure processing of a wafer, when mirror 109 is not present at the position indicated by symbol 109b, a portion of the laser light emitted from laser chamber 107 passes through output mirror 105, with a portion of the laser light being transmitted through etalon 108 and then reflected by total reflection mirror 106. The laser light reflected by total reflection mirror 106 is again transmitted through etalon 108 and directed back into laser chamber 107.

By repeating this operation, the single line is produced by etalon 108, and the band narrowed laser beam L101 is output from output mirror 105. That is, there is obtained from output mirror 105 a single-line, band narrowed laser beam L101 having bandwidth of about 0.2 pm.

In this embodiment, as in the sixth embodiment, calibration is performed on the fly to tune the wavelength of laser beam L101 output from output mirror 105 to the center of the strong line L1.

First, when a wafer is not being subjected to an exposure process, mirror 109 is moved in the direction of the arrow indicated in the figure by symbol 109a (i.e., rightward in the figure) under movement control by a control portion, not shown, and is halted at the position indicated by symbol 109b.

As a result, the laser beam L101 from output mirror 105 is reflected by mirror 109 and proceeds in the direction of laser beam L102 indicated by the broken lines to reach power monitor 110. Power monitor 110 detects the output of laser beam L102 and sends a signal reflecting this finding (monitoring outcome) to a control unit 112 via a signal line 111a.

On the basis of the signal received from power monitor 110, control unit 112 controls piezo element 113 via a signal line 111b to slightly tilt total reflection mirror 106. Thus, when total reflection mirror 106 is tilted to a tilt angle based on the signal from control unit 112, the optical path of the laser light passing through etalon 108 changes slightly with this tilting (for example, the angle of incidence of laser light from total reflection mirror 106 onto etalon 108 changes) so that maximum transmission wavelength in etalon 108 changes slightly. This allows for fine adjustment of the emission wavelength.

In this seventh embodiment, laser beam 102L output values for various angles of incidence of laser light reflected by total reflection mirror 106 onto etalon 108 are measured in control unit 112.

This yields a characteristics graph of measured output values (relative values) versus the angle of incidence of laser light onto etalon 108, i.e., the tilt angle of total reflection mirror 106 (or a signal value corresponding thereto), that is, a profile curve like that shown in FIG. 10. On this curve, the vertical axis gives measured output values (relative values) and the horizontal axis gives total reflection mirror 106 tilt angle or corresponding signal value.

Once such a profile curve has been generated, as in the sixth embodiment, control unit 112 computes a total reflection mirror 106 tilt angle corresponding to a medial location between the sloping lines on either side of the profile curve (peak waveform), for example, to a medial point P lying midway between point P1 and point P2. By controlling piezo element 113 in order to change the tilt of total reflection mirror 106 so as to give this tilt angle, the wavelength of laser beam L101 is matched with the center wavelength of strong line L1.

As described hereinabove, the seventh embodiment offers working effects similar to the sixth embodiment. That is, by tilting total reflection mirror 106 on the basis of total reflection mirror 106 tilt angle computed on the basis of the profile curve, or corresponding signal value thereof, the wavelength of laser beam L101 is matched with the center wavelength of the strong line (the line of wavelength $\lambda 1$ 157.6299 nm). That is, the wavelength laser beam L101 can be calibrated accurately so as to match the center wavelength of the strong line.

Eighth Embodiment

Figure 12:
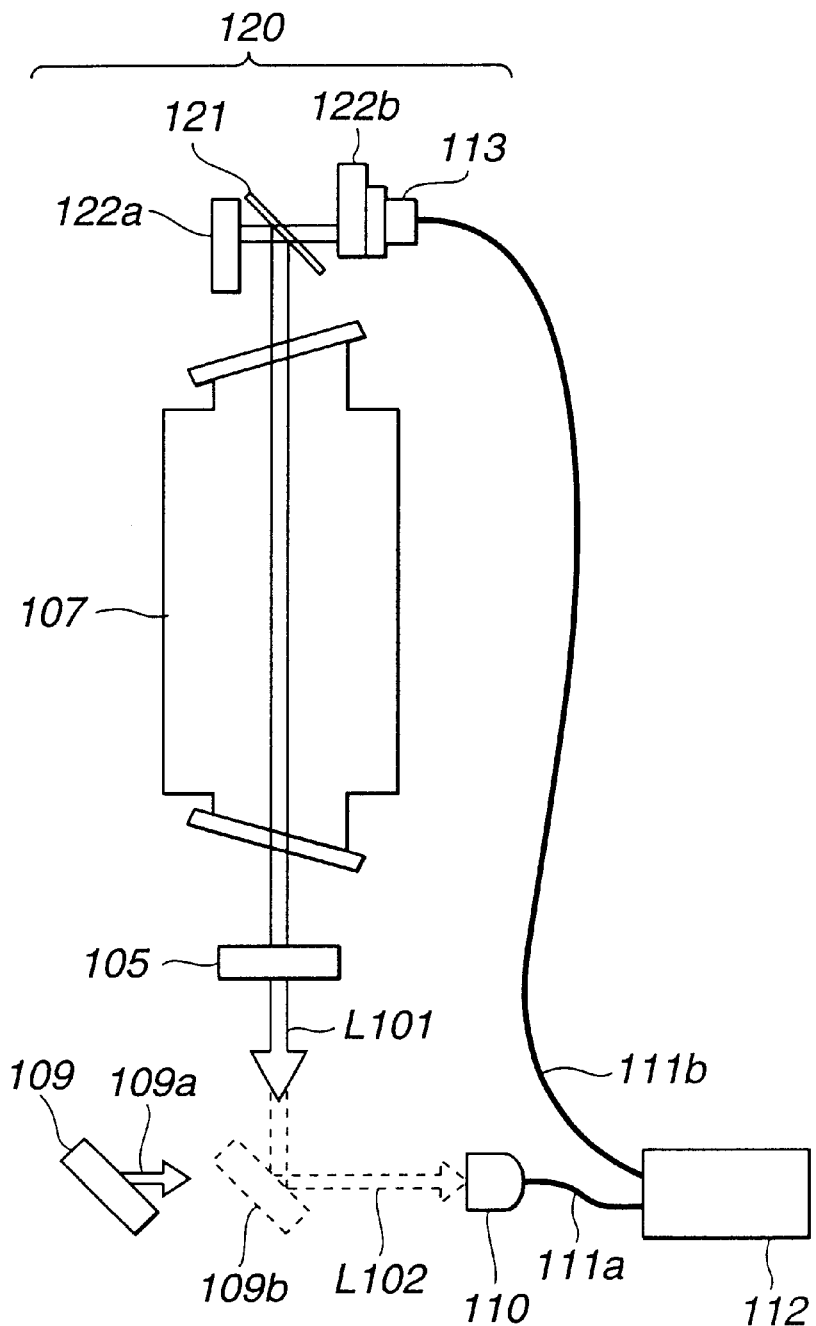
FIG. 12 is a schematic diagram showing the scheme of an ultra narrow band fluorine laser apparatus pertaining to an eighth embodiment.

FIG. 12 is a schematic diagram showing the scheme of an ultra narrow band fluorine laser apparatus 1100 pertaining to an eighth embodiment.

In the scheme shown in FIG. 12, etalon 108 and total reflection mirror 106 have been omitted from, and a mode selector 120 has been added to, the arrangement in FIG. 11 described in the seventh embodiment. Elements identical in function to those in FIG. 11 are assigned the same symbols.

That is, in ultra narrow band fluorine laser apparatus 1100, the resonator is composed of an output mirror 105 and mode selector 120, with a laser chamber 107 being arranged within the resonator.

Mode selector 120 is designed for selective laser oscillation at high reflection wavelengths only. Mode selector 120 is composed of a beam splitter 121 and two reflecting mirrors 122a, 122b.

In this eighth embodiment, as in the seventh embodiment, calibration is performed on the fly to tune the wavelength of laser beam L101 output from output mirror 105 to the center of the strong line L1. While a different method is used for band narrowing of laser beam L101, operation up through generation of the profile curve are basically the same as in the seventh embodiment, so this operation will not be discussed in detail here.

Where a wafer is not being subjected to an exposure process, when laser light reflected from mirror 109 (halted at the position indicated by symbol 109b) reaches power monitor 110, power monitor 110 detects the output of laser beam L102 and sends a signal reflecting this finding to a control unit 112 via a signal line 111a.

On the basis of the received signal, control unit 112 controls piezo element 113 via a signal line 111b. Specifically, control unit 112 performs movement control of piezo element 113 to move reflecting mirror 122b slightly forward or back. Thus, as reflecting mirror 122b moves forward or back, since the gap (i.e., optical path length) between reflecting mirror 122a and reflecting mirror 122b changes in association with this movement, the wavelength selected by mode selector 120 changes.

Specifically, the laser light from laser chamber 107 reflected by beam splitter 121 is reflected by reflecting mirror 122a. A portion of the reflected laser light is reflected by beam splitter 121 and again directed into laser chamber 107. A portion of the laser light reflected by reflecting mirror 122a passes through beam splitter 121 and is reflected by reflecting mirror 122b. This reflected laser light again passes through beam splitter 121 and is reflected by reflecting mirror 122a. By repeating this operation, a single line is produced by mode selector 120, and a band narrowed laser beam L101 is output from output mirror 105.

In this eighth embodiment, laser beam 102L output values for various travel distances of reflecting mirror 122b from a preset position are measured in control unit 112.

This yields a characteristics graph of measured output values (relative values) versus travel distances of reflecting mirror 122b (i.e., the length of the optical path between reflecting mirror 122a and reflecting mirror 122b), that is, a profile curve like that shown in FIG. 10. On this curve, the vertical axis gives measured output values (relative values) and the horizontal axis gives values for reflecting mirror 122b travel distance.

Once such a profile curve has been generated, as in the sixth embodiment, control unit 102 computes a reflecting mirror 122b travel distance corresponding, for example, to a medial point P lying midway between point P1 and point P2 on the profile curve (peak waveform). By controlling piezo element 113 to move reflecting mirror 122b so as to give this travel distance, the wavelength of laser beam L101 is matched with the center wavelength of strong line L1.

As described hereinabove, the eighth embodiment offers working effects similar to the sixth embodiment. That is, by moving reflecting mirror 122b on the basis of a value indicating reflecting mirror 122b travel distance computed on the basis of the profile curve, the wavelength of laser beam L101 is matched with the center wavelength of the strong line (the line of wavelength $\lambda 1=157.6299$ nm). That is, the wavelength laser beam L101 can be calibrated accurately so as to match the center wavelength of the strong line.

Ninth Embodiment

Figure 13:
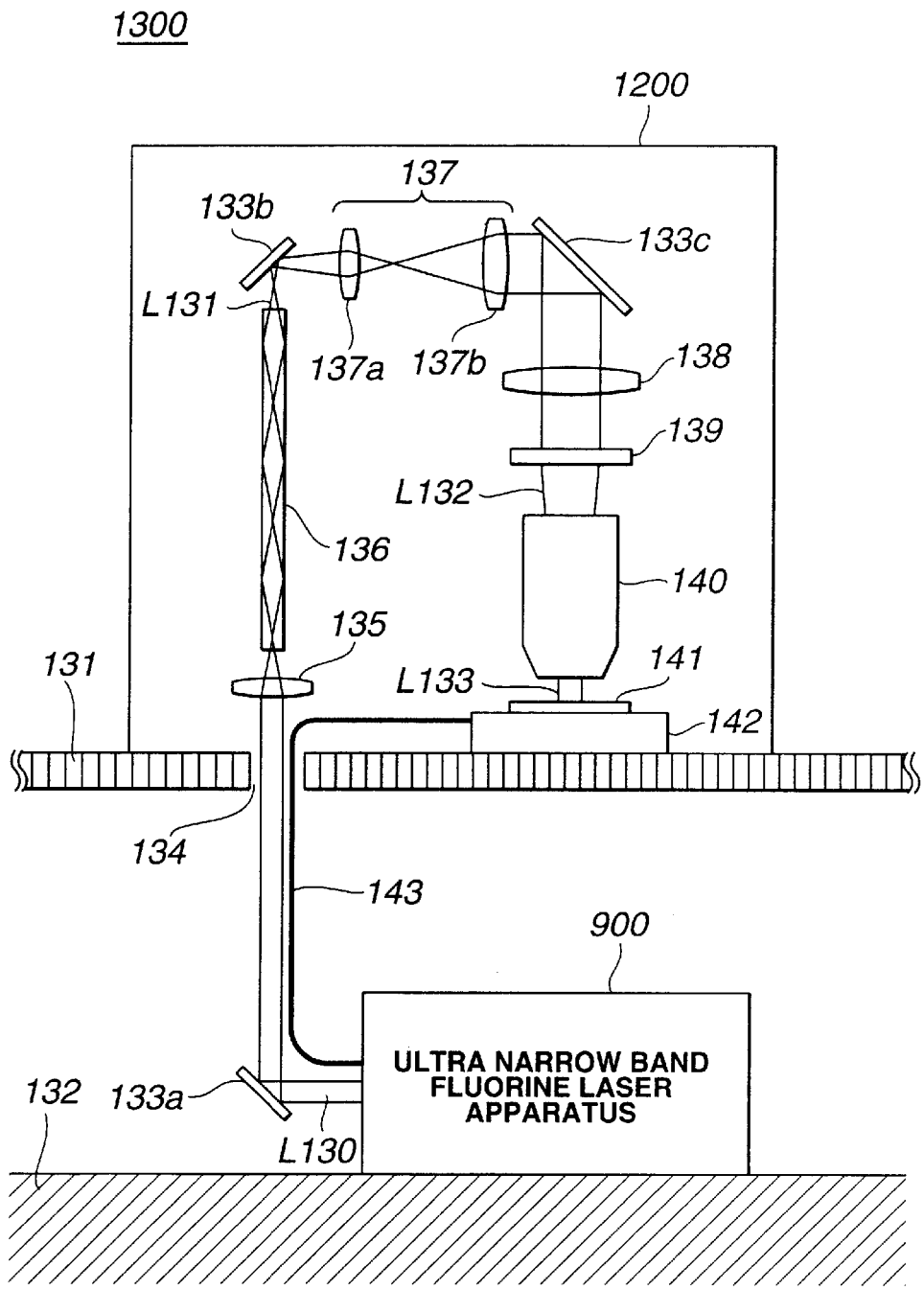
FIG. 13 is a schematic diagram showing the scheme of a fluorine exposer pertaining to a ninth embodiment.

FIG. 13 is a schematic diagram showing the scheme of a fluorine exposer 1300 pertaining to a ninth embodiment.

As shown in the figure, fluorine exposer 1300 is basically composed of the ultra narrow band fluorine laser apparatus 900 shown in FIG. 9, and an exposer main body 1200.

Exposer main body 1200 is arranged on a grating 131 in a cleanroom, while ultra narrow band fluorine laser apparatus 900 is arranged on a floor bed 132 (typically termed a "subfloor") situated below grating 131.

The laser beam L130 obtained from ultra narrow band fluorine laser apparatus 900, which consists exclusively of the strong line L1 with bandwidth of approximately 0.2 pm, is reflected upward by a mirror 133a so as to pass through an aperture 134 in grating 131 and into exposer main body 1200.

The wavelength of laser beam L130 is calibrated to match the center wavelength of the strong line L1 (wavelength $\lambda 1=157.6299$ nm line).

Laser beam L130 is narrowed by a lens 135, proceeds into a calcium fluoride glass rod 136, and through repeated total reflection within glass rod 136 emerges from glass rod 136 as a laser beam L131 with uniform beam intensity distribution.

Laser beam L131 is reflected by mirror a 133b and passed through a beam rectifier 137 composed of lenses 137a, 137b, whereby the cross section of the beam is expanded, and is then reflected by mirror 133c, passed through a condenser lens 138, and directed onto a reticle 139.

The laser beam L132 emerging from reticle 139 is passed through a reducing projection lens 140 and directed onto a wafer 141. That is, the pattern in reticle 139 is transferred onto wafer 141 by reducing projection lens 140. The stage 142 on which wafer 141 is carried moves (steps) the wafer in chip increments during exposure, and moves the wafer during wafer exchange.

The reducing projection lens 140 constituting the reducing projection optical system is composed of a monochromatic calcium fluoride lens.

The reason why it is possible to use a lens-only reducing projection optical system (i.e., reducing projection lens 14) in fluorine exposer 1300 is that the bandwidth of the laser beam L130 from ultra narrow band fluorine laser apparatus 900 is only 0.2 pm, about $\frac{1}{10}$ that of a conventional fluorine laser, so chromatic aberration at reducing projection lens 140 is negligible.

In ultra narrow band fluorine laser apparatus 900 of fluorine exposer 1300, during the interval of about 20 seconds from completion of exposure treatment of a wafer 141 to completion of placement and alignment of a next wafer on stage 142, wavelength is calibrated on the basis of a profile curve (see FIG. 10), as described in the sixth embodiment.

As regards the timing for the wavelength calibration, a signal indicating completion of exposure treatment of the wafer is transmitted to ultra narrow band fluorine laser apparatus 900 via a signal line 143. Ultra narrow band fluorine laser apparatus 900, having received the exposure completion signal, acquires the profile curve and performs wavelength calibration on the basis of this curve.

That is, in FIG. 9, processes such as the process of moving mirror 98 to predetermined position, the monitoring process by power monitor 99, control of rotating stage 103 by control unit 102, acquisition of the profile curve, and wavelength calibration are carried out.

In this ninth embodiment, the wafer exchange period is selected as the timing for wavelength calibration, but the lot exchange time, which would take more time, could also be selected.

As described hereinabove, according to the ninth embodiment, laser light calibrated such that the wavelength of laser beam L101 is matched with the center wavelength of the strong line (the line of wavelength $\lambda 1=157.6299$ nm), i.e., laser light band narrowed to bandwidth of about 0.2 pm, can be used as the light source for exposure.

The only difference from a conventional KrF exposer is that calcium fluoride replaces quartz as the material for the lens of the reducing projection optical system (reducing projection lens 140), allowing conventional KrF exposer design to be used for the exposer main body 1200.

Thus, a total refraction type reducing projection optical system can be employed without appreciably increasing fluorine laser apparatus cost or significantly reducing laser efficiency. The ability to design the reducing projection optical system analogously to that of a conventional KrF exposer allows a commercial fluorine exposure apparatus to be provided quickly and inexpensively.

Since laser light wavelength is calibrated each time that a wafer for exposure treatment is exchanged, it is possible to avoid a state in which exposure conditions differ for individual wafers. That is, exposed wafers of uniform quality are obtained.

Tenth Embodiment

The ultra narrow band fluorine laser apparatus of the tenth embodiment assumes the ultra narrow band fluorine laser apparatus 900 shown in FIG. 9. This embodiment differs from the sixth embodiment in that the process for calibrating emission wavelength is modified. Only this point of difference shall be discussed here.

Typically, in an excimer laser apparatus or fluorine laser apparatus, during the period of several tens of pulses after the onset of laser oscillation, pulse energy rises somewhat (hereinbelow referred to as "initial effect").

A possible reason for the high pulse energy is that just prior to oscillation the laser gas is clean and sufficiently cool, and thus slightly high.

When this pulse energy is used during exposure, several hundred laser pulses have been generated, after which time emission is halted until time T3 while moving (stepping) to the next chip on the wafer (about 0.2 second, for example). As a result, as shown in FIG. 14, there are produced portions of high energy for each single exposure, due to the initial effect.

Figure 14:
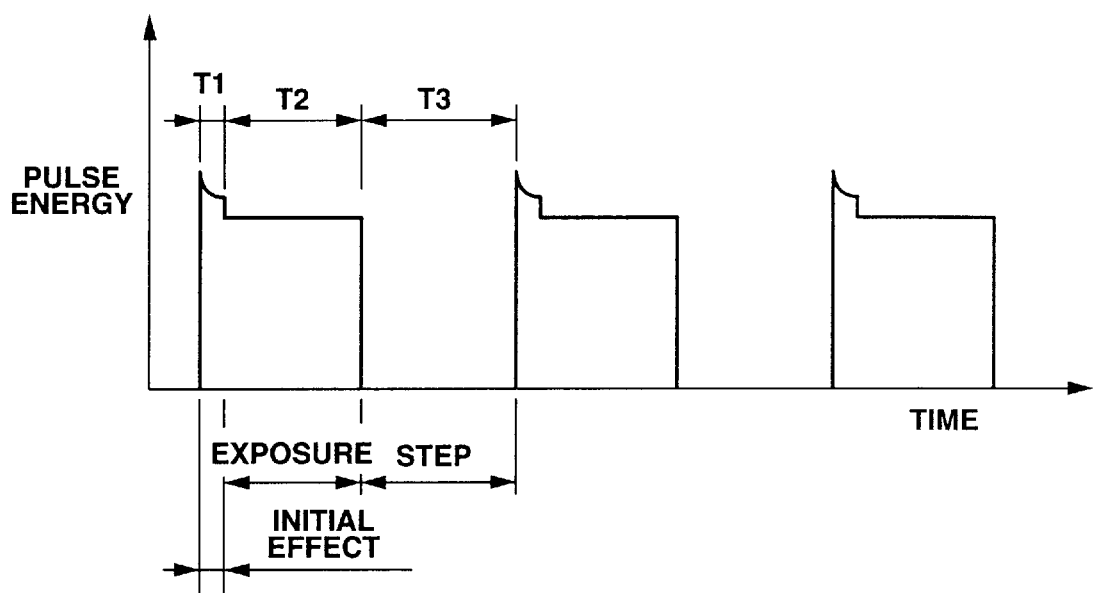
FIG. 14 is an explanatory diagram explaining initial effect in a tenth embodiment.

However, since it is necessary for all pulses to have the same given energy in order to achieve a uniform exposure process, the pulse is not used during the time T1 at which the initial effect is occurring (hereinbelow referred to as "initial effect time"), as shown in FIG. 14. That is, settings are made such that, after a delay equivalent to time T1, a pulse of pulse width T2 is used for exposure; the portion of the pulse corresponding to the delay time is simply wasted.

Figure 15:
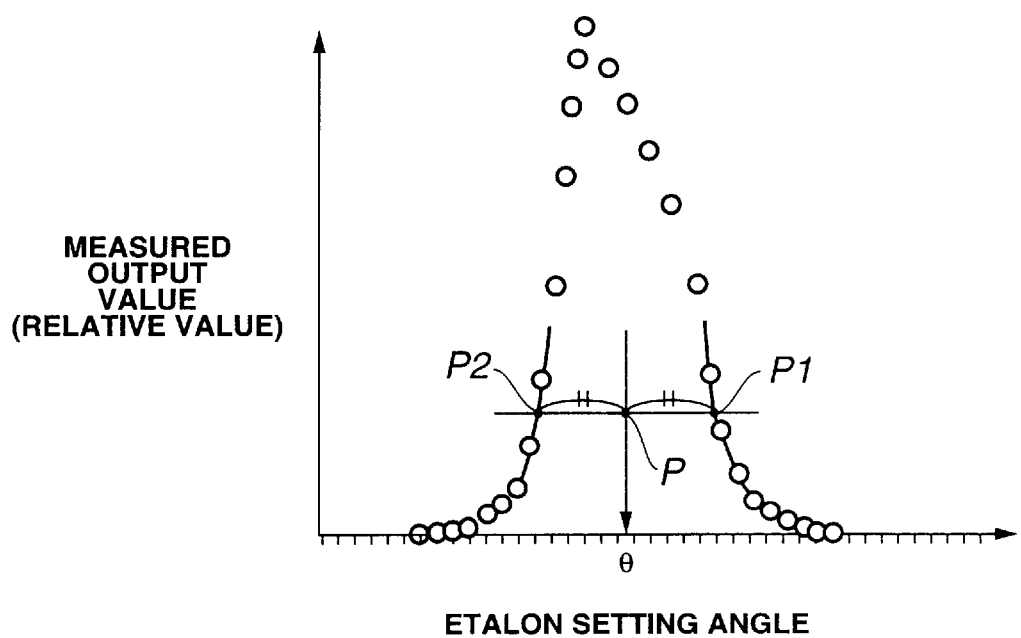
FIG. 15 is an explanatory diagram explaining wavelength calibration in a tenth embodiment.

Accordingly, in the tenth embodiment, the wavelength calibration described earlier is performed during this initial effect time T1. As a result, the pulse energy profile curve obtained during wavelength calibration is not the laterally symmetrical peak shown in FIG. 10, but rather the laterally asymmetrical peak shown in FIG. 15.

In this case, the setting angle for the etalon or other wavelength selection element is not a point in proximity to the center of the profile curve, but is rather a setting angle θ corresponding to the middle of the two sloping line portions of the laterally asymmetrical peak, for example, to point P located midway between point P1 and P2.

By performing wavelength calibration at the outset of each laser operation during the initial effect time, the several tens of pulses emitted during initial effect time T1 are not wasted.

The ability to use several tens of pulses during initial effect time is possible because the bandwidth of each line in a fluorine laser is 1 to 2 pm, which is a characteristic feature of fluorine lasers.

The reason is that the bandwidth resulting from band narrowing by the band narrowing element is about 0.2 pm, and this must be stable with reproducibility of about ±0.05 pm. That is, scanning the entire 2 pm bandwidth in 0.05 pm increments during wavelength calibration requires a total of 40 pulses, for which purpose the several tens of pulses during initial effect time are sufficient.

In contrast thereto, where the original oscillation bandwidth is about 300 pm, as with a KrF excimer laser or ArF excimer laser, 600 pulses are required, which is more than the number of pulses required for exposure (typically from 100 to 500 pulses for each shot), and a such represents a waste since most of the energy is not actually employed in exposure.

In a fluorine exposer comprising the ultra narrow band fluorine laser apparatus of the tenth invention, pulses emitted at the outset of laser operation are utilized for performing calibration of the laser light wavelength, so wavelength-calibrated, band-narrowed laser light can be used for the wafer exposure process.

As described hereinabove, according to the tenth embodiment, wavelength calibration is performed at the outset of each laser operation, such as during initial effect time, whereby the several tens of pulses emitted during initial effect time T1 are not wasted, and the generated pulses can be utilized effectively.

What is claimed is:

1. An ultra narrow band fluorine laser apparatus which provides oscillated laser light of a fluorine laser as a light source for an exposure apparatus, comprising:
    a fluorine laser having oscillation lines of different wavelengths and light intensities;
    a wavelength selection element whose transmittance or reflectivity varies cyclically in accordance with a wavelength of incident light, for narrowing a band of the oscillated light of the fluorine laser, wherein
    the wavelength selection element is composed of:
        an optical element with cyclically varying transmittance or reflectivity for a number of essentially given wavelengths, so that when a center wavelength of a first oscillation line thereof having a stronger light intensity is situated at one selected wavelength in the element, the optical element situates a center wavelength of a second oscillation line having a weaker light intensity than the first oscillation line between two adjacent selected wavelengths in the element.

2. The ultra narrow band fluorine laser apparatus according to claim 1, wherein the wavelength selection element is constituted such that transmittance at the center wavelength of the second oscillation or less the transmittance at the center wavelength of the first oscillation line.

3. The ultra narrow band fluorine laser apparatus according to claim 2, further comprising:
    an oscillating stage for oscillating the laser light of the fluorine laser; and an amplifying stage, and wherein
        the wavelength selection element is situated on an optical path between the oscillating stage and the amplifying stage.

4. The ultra narrow band fluorine laser apparatus according to claim 2, wherein the laser light band-narrowed by the wavelength selection element is provided to a fluorine exposure apparatus having a lens-only total refraction type reducing projection optical system.

5. The ultra narrow band fluorine laser apparatus according to claim 1, wherein the wavelength selection element is a mode selector composed of splitting means having a beam splitting face and two reflection means having reflecting faces.

6. The ultra narrow band fluorine laser apparatus according to claim 5, wherein the laser light band-narrowed by the wavelength selection element is provided to a fluorine exposure apparatus having a lens-only total refraction type reducing projection optical system.

7. The ultra narrow band fluorine laser apparatus according to claim 1, further comprising:
    an oscillating stage for oscillating the laser light of the fluorine laser; and an amplifying stage, and wherein
        the wavelength selection element is situated on an optical path between the oscillating stage and the amplifying stage.

8. The ultra narrow band fluorine laser apparatus according to claim 7, wherein the laser light band-narrowed by the wavelength selection element is provided to a fluorine exposure apparatus having a lens-only total refraction type reducing projection optical system.

9. The ultra narrow band fluorine laser apparatus according to claim 1, wherein the laser light band-narrowed by the wavelength selection element is provided to a fluorine exposure apparatus having a lens-only total refraction type reducing projection optical system.

10. An ultra narrow band fluorine laser apparatus which narrows a band of laser light of a fluorine laser and provides the band-narrowed laser light as a light source for an exposure apparatus, comprising:
 a wavelength selection element being arranged so that a selected wavelength can be adjusted, for narrowing the band of incident laser light of the fluorine laser for output;
 monitoring means for monitoring the output of laser light output from the wavelength selection element; and
 adjusting means for adjusting, on the basis of a monitoring outcome from the monitoring means, the wavelength selected by the wavelength selection element so as to maximize the output of laser light output from the wavelength selection element.

11. The ultra narrow band fluorine laser apparatus according to claim 10, wherein the wavelength selection element comprises:
 an optical element for varying a selected wavelength in accordance with an angle of incidence of the laser light thereon;
 the monitoring means comprises:
  means for monitoring output of laser light of each selected wavelength corresponding to each of a plurality of different angles of incidence for the laser light incident on the optical element; and
 the adjusting means comprises:
  control means for computing, on the basis of a monitoring outcome from the means for monitoring, the angle of incidence serving to maximize the output of the laser light output from the wavelength selection element, and causing laser light to be incident on the wavelength selection element on the basis of the angle of incidence so calculated.

12. The ultra narrow band fluorine laser apparatus according to claim 11, further comprising:
 varying means for varying a placement position of the wavelength selection element within a range in which the laser light is incident on the wavelength selection element; and
 the control means comprises:
  means for controlling the varying means in such a way that when the output of laser light output from the wavelength selection element whose placement position is varied by the varying means reaches maximum, laser light is caused to be incident on the wavelength selection element on the basis of the angle of incidence calculated from the monitoring outcome.

13. A fluorine exposure apparatus comprising:
 the ultra narrow band fluorine laser apparatus according to claim 12;
 an exposure apparatus main body employing narrow band laser light oscillated from the ultra narrow band fluorine laser apparatus as a light source for exposure to subject a wafer to an exposure process, and notifying the ultra narrow band fluorine laser apparatus when a wafer to be subjected to the exposure process is exchanged, wherein
  the ultra narrow band fluorine laser apparatus is designed to adjust a wavelength selected by the wavelength selection element when notified by the exposure apparatus of exchange of the wafer to be subjected to the exposure process.

14. The ultra narrow band fluorine laser apparatus according to claim 11, further comprising:
 reflecting means for reflecting laser light so as to guide the laser light into the wavelength selection element; and varying means for varying a placement position of the reflecting means within a range such that laser light reflected by the reflecting means is incident on the wavelength selection element; and
 the control means comprises:
  means for controlling the varying means in such a way that when the output of the wavelength selection element upon which is incident laser light from the reflecting means whose placement position is varied by the varying means reaches maximum, laser light is caused to be incident on the wavelength selection element on the basis of the angle of incidence calculated from the monitoring outcome.

15. A fluorine exposure apparatus comprising:
 the ultra narrow band fluorine laser apparatus according to claim 14,
 an exposure apparatus main body employing narrow band laser light oscillated from the ultra narrow band fluorine laser apparatus as a light source for exposure to subject a wafer to an exposure process; wherein
  the ultra narrow band fluorine laser apparatus is designed to adjust a wavelength selected by the wavelength selection element immediately after start of laser oscillation.

16. A fluorine exposure apparatus comprising:
 the ultra narrow band fluorine laser apparatus according to claim 11;
 an exposure apparatus main body employing narrow band laser light oscillated from the ultra narrow band fluorine laser apparatus as a light source for exposure to subject a wafer to an exposure process, and notifying the ultra narrow band fluorine laser apparatus when a wafer to be subjected to the exposure process is exchanged, wherein
  the ultra narrow band fluorine laser apparatus is designed to adjust a wavelength selected by the wavelength selection element when notified by the exposure apparatus of exchange of the wafer to be subjected to the exposure process.

17. The ultra narrow band fluorine laser apparatus according to claim 10, wherein the wavelength selection element is a mode selector composed at least of splitting means having a beam splitting face; and two reflecting means having reflecting faces, an optical path length being determined by relative positions of these plurality of composing elements;
 the monitoring means comprises:
  means for monitoring output of laser light for each of selected wavelengths corresponding to each of a plurality of different optical path lengths in the mode selector; and
 the adjusting means comprises:
  optical path length adjusting means for adjusting optical path length in the mode selector by varying the placement of at least one composing element selected from the plurality of composing elements in the mode selector; and
   control means which, for each of the plurality of different optical path lengths resulting from adjustment by the optical path length adjusting means, calculates, on the basis of a monitoring outcome monitored by the means for monitoring, the optical path length so as to maximize the output of the laser light output from the wavelength selection element.

18. A fluorine exposure apparatus comprising:
 the ultra narrow band fluorine laser apparatus according to claim 17, an exposure apparatus main body employing narrow band laser light oscillated from the ultra narrow band fluorine laser apparatus as a light source for exposure to subject a wafer to an exposure process; wherein the ultra narrow band fluorine laser apparatus is designed to adjust a wavelength selected by the wavelength selection element immediately after start of laser oscillation.

19. A fluorine exposure apparatus comprising:

the ultra narrow band fluorine laser according to claim 10; and an exposure apparatus main body employing narrow band laser light oscillated from the ultra narrow band fluorine laser apparatus as a light source for exposure to subject a wafer to an exposure process, and notifying the ultra narrow band fluorine laser apparatus when a wafer to be subjected to the exposure process is exchanged;

wherein the ultra narrow band fluorine laser apparatus adjusts a wavelength selected by the wavelength selection element when notified by the exposure apparatus of exchange of the wafer to be subjected to the exposure process.

20. A fluorine exposure apparatus comprising:

the ultra narrow band fluorine laser apparatus of claim 10, and an exposure apparatus main body employing narrow band laser light oscillated from the ultra narrow band fluorine laser apparatus as a light source for exposure to subject a wafer to an exposure process;

wherein the ultra narrow band fluorine laser apparatus adjusts a wavelength selected by the wavelength selection element immediately after start of laser oscillation.

* * * * *